US009620851B2

(12) United States Patent
Shimura et al.

(10) Patent No.: US 9,620,851 B2
(45) Date of Patent: Apr. 11, 2017

(54) WIRELESS COMMUNICATION DEVICE AND ELECTRONIC DEVICE

(71) Applicant: FUJITSU LIMITED, Kawasaki-shi, Kanagawa (JP)

(72) Inventors: Toshihiro Shimura, Yokohama (JP); Yoji Ohashi, Fuchu (JP)

(73) Assignee: FUJITSU LIMITED, Kawasaki (JP)

(*) Notice: Subject to any disclaimer, the term of this patent is extended or adjusted under 35 U.S.C. 154(b) by 37 days.

(21) Appl. No.: 14/746,099

(22) Filed: Jun. 22, 2015

(65) Prior Publication Data

US 2015/0288057 A1 Oct. 8, 2015

Related U.S. Application Data

(63) Continuation of application No. PCT/JP2013/050010, filed on Jan. 4, 2013.

(51) Int. Cl.

*H01Q 1/24* (2006.01)
*H01Q 9/04* (2006.01)
*H01Q 1/48* (2006.01)
*H01Q 13/10* (2006.01)
*H01Q 7/00* (2006.01)
*H04B 5/00* (2006.01)

(52) U.S. Cl.

CPC ............... *H01Q 1/243* (2013.01); *H01Q 1/48* (2013.01); *H01Q 7/00* (2013.01); *H01Q 9/0407* (2013.01); *H01Q 13/106* (2013.01); *H04B 5/00* (2013.01)

(58) Field of Classification Search

None

See application file for complete search history.

(56) References Cited

U.S. PATENT DOCUMENTS 5,955,752 A 9/1999 Fukaya et al.
6,879,293 B2 * 4/2005 Sato ...................... G06F 1/1616 343/700 MS
7,782,624 B2 * 8/2010 Fujii .................. H01L 23/3128 257/686

(Continued)

FOREIGN PATENT DOCUMENTS

JP 11-4118 1/1999
JP 2004-40680 2/2004

(Continued)

OTHER PUBLICATIONS

International Search Report, mailed in connection with PCT/JP2013/050010 and mailed Jan. 29, 2013.

(Continued)

*Primary Examiner* — Howard Williams

(74) *Attorney, Agent, or Firm* — Fujitsu Patent Center

(57) ABSTRACT

A wireless communication device includes a first housing including a first opening part; a second housing including a second opening part facing the first opening part, the second housing being arranged to face the first housing; a first resonance device including a first resonator, the first resonance device being arranged inside the first housing such that the first resonator is facing outside from the first opening part; and a second resonance device including a second resonator, the second resonance device being arranged inside the second housing such that the second resonator is facing outside from the second opening part and is facing the first resonator.

9 Claims, 22 Drawing Sheets

(56) References Cited

U.S. PATENT DOCUMENTS

| | | | | |
|---|---|---|---|---|
| 2005/0090274 | A1 | 4/2005 | Miyashita | |
| 2005/0099242 | A1 | 5/2005 | Sano | |
| 2007/0164861 | A1 | 7/2007 | Sano | |
| 2008/0153416 | A1 | 6/2008 | Washiro | |
| 2010/0231320 | A1 | 9/2010 | Kawamura | |
| 2011/0110404 | A1 | 5/2011 | Washiro | |
| 2011/0158344 | A1 | 6/2011 | Kawamura et al. | |
| 2011/0309893 | A1* | 12/2011 | Kawamura | H01Q 9/0407 333/104 |
| 2012/0033931 | A1 | 2/2012 | Usui et al. | |
| 2012/0182094 | A1* | 7/2012 | Kawamura | H01Q 1/24 333/239 |

FOREIGN PATENT DOCUMENTS

| | | |
|---|---|---|
| JP | 2004-304624 | 10/2004 |
| JP | 2005-130295 | 5/2005 |
| JP | 2005-142884 | 6/2005 |
| JP | 2005-184124 | 7/2005 |
| JP | 2007-180742 | 7/2007 |
| JP | 2008-067012 | 3/2008 |
| JP | 2008-099235 | 4/2008 |
| JP | 2008-252566 | 10/2008 |
| JP | 2010-074794 | 4/2010 |
| JP | 2010-103978 | 5/2010 |
| JP | 2010-219816 | 9/2010 |
| WO | 2010/119776 A1 | 10/2010 |

OTHER PUBLICATIONS

JPOA—Office Action mailed on Mar. 8, 2016 issued with respect to the basic Japanese Patent Application No. 2014-555404, with partial English translated office action.

* cited by examiner

180C
FIRST PLANE
SECOND PLANE
180C 180G
180C
180G
FIRST PLANE
SECOND PLANE
180B
180B
180D

180C
FIRST PLANE
SECOND PLANE
180E
180F1
180F

180C
FIRST PLANE
SECOND PLANE
180B
180B
180D 180C
180A
FIRST PLANE
SECOND PLANE
180B
180B
180D

190A2
190A1
190G
190C
190B
190D
190E
190F
190F1
FIRST PLANE
SECOND PLANE

WIRELESS COMMUNICATION DEVICE AND ELECTRONIC DEVICE

CROSS-REFERENCE TO RELATED APPLICATION

This application is a U.S. continuation application filed under 35 USC 111(a) claiming benefit under 35 USC 120 and 365(c) of PCT Application PCT/JP2013/050010 filed on Jan. 4, 2013, the entire contents of which are incorporated herein by reference.

FIELD

The embodiments discussed herein are related to a wireless communication device and an electronic device.

BACKGROUND

Conventionally, there is an AV (Audio Visual) device in which a millimeter-wave communication function is incorporated. This AV device includes a housing case of the AV device provided with a first window frame for millimeter-wave communication, and a first window attached to the first window frame through which millimeter-wave signals are passed (see, for example, Patent Document 1).

This AV device further includes a semiconductor chip with an antenna positioned inside the first window for radiating millimeter-wave signals; and a waveguide realized by a dielectric waveguide or a waveguide groove provided in the housing case between the first window and the semiconductor chip with an antenna.

In this AV device, the millimeter-wave signals that are radiated from the semiconductor chip with an antenna, are radiated outside via the waveguide and the first window.

Patent Document 1: Japanese Laid-Open Patent Publication No. 2007-180742

In a conventional AV device, when performing wireless communication with another AV device, the millimeter-wave signals that are radiated from the semiconductor chip with an antenna, are radiated outside via the waveguide and the first window as described above, and therefore the transmission efficiency of wireless communication device has been low.

SUMMARY

According to an aspect of the embodiments, a wireless communication device includes a first housing including a first opening part; a second housing including a second opening part facing the first opening part, the second housing being arranged to face the first housing; a first resonance device including a first resonator, the first resonance device being arranged inside the first housing such that the first resonator is facing outside from the first opening part; and a second resonance device including a second resonator, the second resonance device being arranged inside the second housing such that the second resonator is facing outside from the second opening part and is facing the first resonator.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

A description is given of a wireless communication device and an electronic device according to an embodiment of the present invention.

First Embodiment

Figure 1:
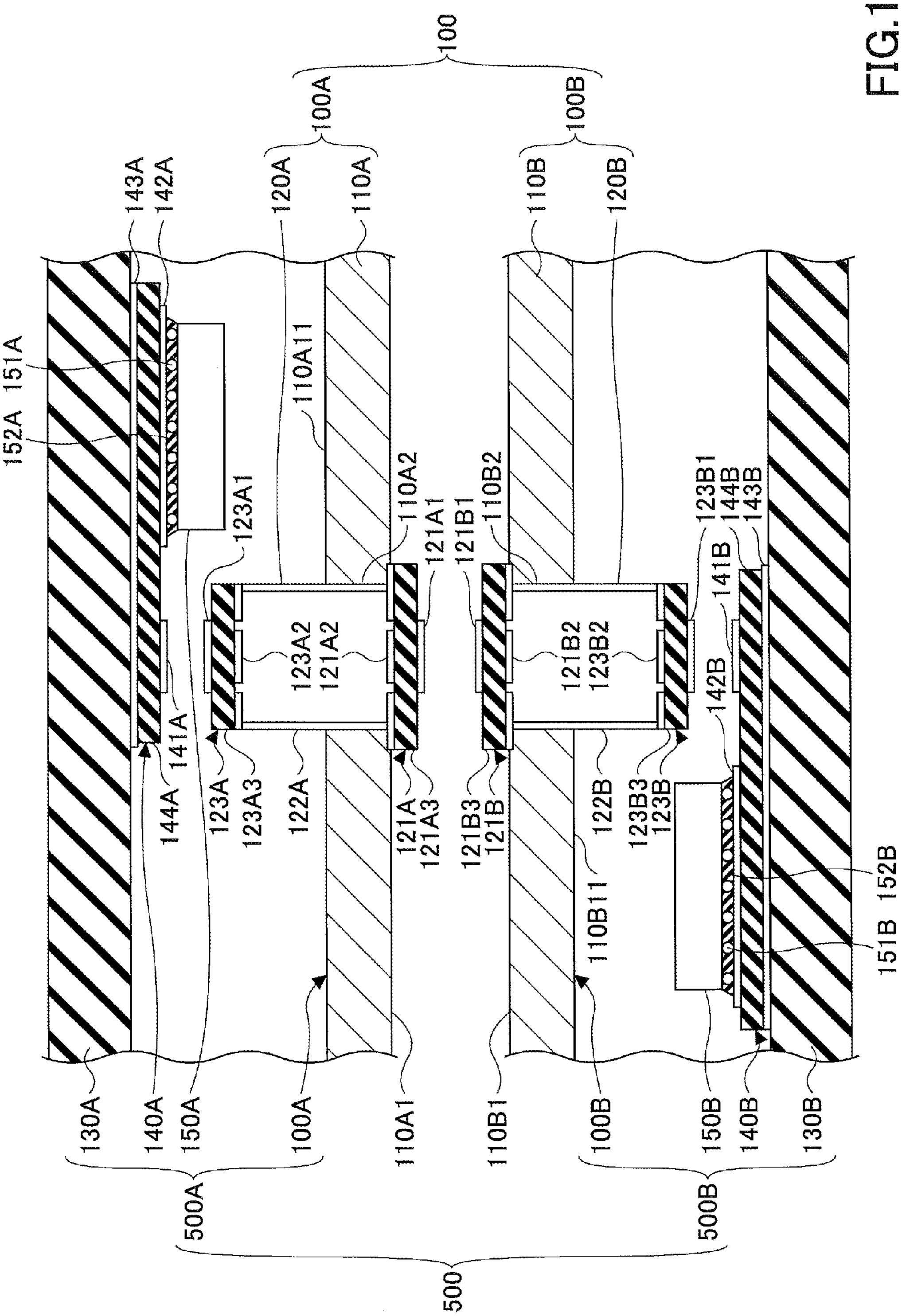
FIG. 1 is a cross-sectional view of a wireless communication device 100 and an electronic device 500 according to a first embodiment.

FIG. 1 is a cross-sectional view of a wireless communication device 100 and an electronic device 500 according to a first embodiment. FIGS. 2A through 2E are cross-sectional views of examples of a waveguide tube of a resonance device of the wireless communication device 100 according to the first embodiment.

The wireless communication device 100 according to the first embodiment includes a wireless communication device 100A and a wireless communication device 100B. The wireless communication device 100A includes a housing 110A and a resonance device 120A. The wireless communication device 100B includes a housing 110B and a resonance device 120B.

The electronic device 500 according to the first embodiment includes an electronic device 500A and an electronic device 500B. The electronic device 500A includes the wireless communication device 100A, a substrate 130A, a substrate 140A, and a circuit device 150A. Similarly, the electronic device 500B includes the wireless communication device 100B, a substrate 130B, a substrate 140B, and a circuit device 150B.

Note that here, the substrate 130A and the substrate 140A are handled as constituent elements of the electronic device 500A; however, the substrate 130A and the substrate 140A may be handled as constituent elements of the wireless communication device 100A. That is to say, the wireless communication device 100A may be handled as including the housing 110A, the resonance device 120A, the substrate 130A, and the substrate 140A.

Similarly, here, the substrate 130B and the substrate 140B are handled as constituent elements of the electronic device 500B; however, the substrate 130B and the substrate 140B may be handled as constituent elements of the wireless communication device 100B. That is to say, the wireless communication device 100B may be handled as including the housing 110B, the resonance device 120B, the substrate 130B, and the substrate 140B.

The housing 110A and the housing 110B are, for example, housings made of metal, and include a wall part 110A1 and a wall part 110B1, respectively. The housing 110A and the housing 110B are arranged such that the wall part 110A1 and the wall part 110B1 are closely-situated and substantially parallel to each other. The housing 110A is an example of a first housing, and the housing 110B is an example of a second housing. The wall part 110A1 is an example of a first wall part, and the wall part 110B1 is an example of a second wall part.

The housing 110A and the housing 110B include an opening part 110A2 and an opening part 110B2 that are formed in the wall part 110A1 and the wall part 110B1, respectively. The opening part 110A2 is an example of a first opening part and the opening part 110B2 is an example of a second opening part.

FIG. 1 illustrates a state where a waveguide tube 122A and a waveguide tube 122B of the resonance device 120A and the resonance device 120B, are fit in the opening part 110A2 and the opening part 110B2, respectively. The opening part 110A2 and the opening part 110B2 are rectangular opening parts in a plan view, which are formed to match the cross-sectional shapes of the waveguide tube 122A and the waveguide tube 122B, respectively.

Note that FIG. 1 only illustrates the part of the wall part 110A1 where the opening part 110A2 is formed among the wall parts of the housing 110A; however, the housing 110A is formed so as to surround (incorporate) the resonance device 120A, the substrate 130A, the substrate 140A, and the circuit device 150A. Similarly, FIG. 1 only illustrates the part of the wall part 110B1 where the opening part 110B2 is formed among the wall parts of the housing 110B; however, the housing 110B is formed so as to surround (incorporate) the resonance device 120B, the substrate 130B, the substrate 140B, and the circuit device 150B.

The resonance device 120A and the resonance device 120B are fit in the opening part 110A2 and the opening part 110B2, respectively. The resonance device 120A includes a resonance substrate 121A, a waveguide tube 122A, and a resonance substrate 123A. Similarly, the resonance device 120B includes a resonance substrate 121B, a waveguide tube 122B, and a resonance substrate 123B. The resonance device 120A is an example of a first resonance device, and the resonance device 120B is an example of a second resonance device. The waveguide tube 122A is an example of a first waveguide tube, and the waveguide tube 122B is an example of a second waveguide tube.

The resonance device 120A is fit in the opening part 110A2, such that a resonator 121A1 of the resonance substrate 121A is facing the outside of the housing 110A from the opening part 110A2. The waveguide tube 122A of the resonance device 120A has a rectangular cross-sectional shape, and therefore the opening part 110A2 is open in a rectangular shape so as to match the cross-sectional shape of the waveguide tube 122A. The resonator 121A1 is an example of a first resonator.

The radiation plane of the resonator 121A1 is positioned outside of the housing 110A, more than a plane of the wall part 110A1 positioned inside the housing 110A. That is to say, the resonator 121A1 is arranged such that the radiation plane is at a position on the outside of the housing 110A, more than an inner wall 110A11 of the housing 110A.

This position is set such that the electromagnetic waves radiated from the resonator 121A1 are not propagated inside the housing 110A but propagated outside the housing 110A.

Similarly, the resonance device 120B is fit in the opening part 110B2, such that a resonator 121B1 of the resonance substrate 121B is facing the outside of the housing 110B from the opening part 110B2. The waveguide tube 122B of the resonance device 120B has a rectangular cross-sectional shape, and therefore the opening part 110B2 is open in a rectangular shape so as to match the cross-sectional shape of the waveguide tube 122B. The resonator 121B1 is an example of a second resonator.

The radiation plane of the resonator 121B1 is positioned outside of the housing 110B, more than a plane of the wall part 110B1 positioned inside the housing 110B. That is to say, the resonator 121B1 is arranged such that the radiation plane is at a position on the outside of the housing 110B, more than an inner wall 110B11 of the housing 110B.

This position is set such that the electromagnetic waves radiated from the resonator 121B1 are not propagated inside the housing 110B but propagated outside the housing 110B.

The resonance substrate 121A includes the resonator 121A1, a resonator 121A2, and an insulating layer 121A3. The resonator 121A1 is formed on the side of the insulating layer 121A3 opposite to the side that is connected to the waveguide tube 122A, and the resonator 121A2 is formed on the side that is connected to the waveguide tube 122A of the insulating layer 121A3.

For example, the resonator 121A1 and the resonator 121A2 are formed by patterning the copper foil adhered to the front side and the back side of the insulating layer 121A3. The resonance substrate 121A transmits electromagnetic waves between the resonator 121A1 and the resonator 121A2.

Similarly, resonance substrate 121B includes the resonator 121B1, a resonator 121B2, and an insulating layer 121B3. The resonator 121B1 is formed on the side of the insulating layer 121B3 opposite to the side that is connected to the waveguide tube 122B, and the resonator 121B2 is formed on the side that is connected to the waveguide tube 122B of the insulating layer 121B3.

For example, the resonator 121B1 and the resonator 121B2 are formed by patterning the copper foil adhered to the front side and the back side of the insulating layer 121B3. The resonance substrate 121B transmits electromagnetic waves between the resonator 121B1 and the resonator 121B2.

Figure 2A:
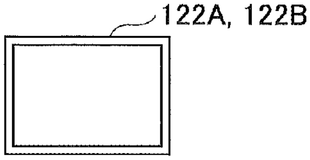
FIGS. 2A through 2E are cross-sectional views of examples of a waveguide tube of a resonance device of the wireless communication device 100 according to the first embodiment.
Figure 2B:
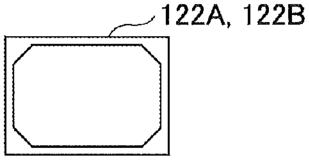
Figure 2C:
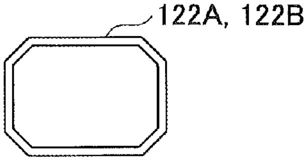
Figure 2D:
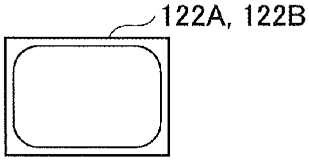
Figure 2E:
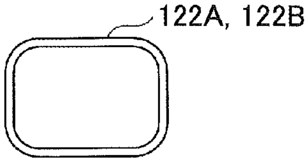

For example, the waveguide tube 122A and the waveguide tube 122B are constituted by a metal film that is molded into a rectangular tube having a cross-sectional shape as illustrated in FIG. 2A. Alternatively, for example, the waveguide tube may have a cross-sectional shape that is an octagon formed by deforming the four corners in an oblique manner by 45 degrees on the outside or the inside of the rectangular tube, or a circular rectangle formed by deforming the four corners in an arc-like manner on the outside or the inside of the rectangular tube, as illustrated in FIGS. 2B, 2C, 2D, and 2E. By eliminating the corners of the rectangular tube as described above, it is easier to form the waveguide tube or easier to fit the waveguide tube in the opening part of the housing. As the metal film, for example, copper foil or metal foil made of aluminum may be used. The waveguide tube 122A and the waveguide tube 122B are to have the inner faces covered by a metal layer, and therefore a metal layer may be formed on the inner surfaces of the resin member having a shape of a rectangular tube or a deformed rectangle. Alternatively, the waveguide tube 122A and the waveguide tube 122B may be a hollow waveguide tube only having a metal layer without the inner resin. For example, the metal layer may be made of copper or aluminum. The waveguide tube 122A is connected to the metal layer of the resonator 121A2 and a resonator 123A2, and is maintained at the same potential as that of the metal layer of the resonator 121A2 and the resonator 123A2. Similarly, the waveguide tube 122B is connected to the metal layer of the resonator 121B2 and a resonator 123B2, and is maintained at the same potential as that of the metal layer of the resonator 121B2 and a resonator 123B2. Note that detailed configurations are described below with reference to FIG. 4.

One end of the waveguide tube 122A (bottom end as viewed in FIG. 1) is connected to the resonator 121A2 of the resonance substrate 121A, and the other end (top end as viewed in FIG. 1) is connected to the resonator 123A2 of the resonance substrate 123A. The waveguide tube 122A forms a waveguide between the resonator 121A2 and the resonator 123A2.

The cross-sectional plane of the waveguide tube 122A that is parallel to the resonance substrate 121A and the resonance substrate 123A, has a rectangular shape. The waveguide tube 122A transmits electromagnetic waves between the resonance substrate 121A and the resonance substrate 123A.

Similarly, one end of the waveguide tube 122B (top end as viewed in FIG. 1) is connected to the resonator 121B2 of the resonance substrate 121B, and the other end (bottom end as viewed in FIG. 1) is connected to the resonator 123B2 of the resonance substrate 123B. The waveguide tube 122B forms a waveguide between the resonator 121B2 and the resonator 123B2.

The cross-sectional plane of the waveguide tube 122B that is parallel to the resonance substrate 121B and the resonance substrate 123B, has a rectangular shape. The waveguide tube 122B transmits electromagnetic waves between the resonance substrate 121B and the resonance substrate 123B.

The resonance substrate 123A includes a resonator 123A1, the resonator 123A2, and an insulating layer 123A3. The resonator 123A1 is formed on the side of the insulating layer 123A3 opposite to the side that is connected to the waveguide tube 122A, and the resonator 123A2 is formed on the side that is connected to the waveguide tube 122A of the insulating layer 123A3. The resonator 123A1 is an example of a third resonator.

For example, the resonator 123A1 and the resonator 123A2 are formed by patterning the copper foil adhered to the front side and the back side of the insulating layer 123A3. The resonance substrate 123A transmits electromagnetic waves between the resonator 123A1 and the resonator 123A2. Furthermore, the resonator 123A1 transmits electromagnetic waves between the resonator 123A1 and a resonator 141A of the substrate 140A.

Similarly, the resonance substrate 123B includes a resonator 123B1, the resonator 123B2, and an insulating layer 123B3. The resonator 123B1 is formed on the side of the insulating layer 123B3 opposite to the side that is connected to the waveguide tube 122B, and the resonator 123B2 is formed on the side that is connected to the waveguide tube 122B of the insulating layer 123B3. The resonator 123B1 is an example of a fourth resonator.

For example, the resonator 123B1 and the resonator 123B2 are formed by patterning the copper foil adhered to the front side and the back side of the insulating layer 123B3. The resonance substrate 123B transmits electromagnetic waves between the resonator 123B1 and the resonator 123B2. Furthermore, the resonator 123B1 transmits electromagnetic waves between the resonator 123B1 and a resonator 141B of the substrate 140B.

The substrate 130A and the substrate 130B are arranged inside the housing 110A and the housing 110B, respectively; and on the substrate 130A and the substrate 130B, the substrate 140A and the substrate 140B are mounted, respectively. The substrate 130A and the substrate 130B are larger substrates than the substrate 140A and the substrate 140B, respectively. For example, the substrate 130A and the substrate 130B are printed circuit boards (PCB) conforming to the FR-4 (Flame Retardant Type 4) specification, and include a plurality of wiring layers arranged on the front side, the inner layer, and the back side.

The substrate 140A and the substrate 140B are mounted on the substrate 130A and the substrate 130B inside the housing 110A and the housing 110B, respectively. For example, the substrate 140A and the substrate 140B are printed circuit boards conforming to the FR-4 specification.

The substrate 140A includes the resonator 141A, a wiring layer 142A, a wiring layer 143A, and an insulating layer 144A. The resonator 141A, the wiring layer 142A, and the wiring layer 143A are formed by patterning the copper foil adhered on the front side and the back side of the insulating layer 144A.

The resonator 141A transmits electromagnetic waves between the resonator 141A and the resonator 123A1 of the resonance substrate 123A. The wiring layer 142A and the wiring layer 143A are maintained at ground potential. On the wiring layer 142A, a circuit device 150A is mounted via solder balls 151A. The substrate 140A is connected to the substrate 130A via the wiring layer 143A.

Similarly, substrate 140B includes the resonator 141B, a wiring layer 142B, a wiring layer 143B, and an insulating layer 144B. The resonator 141B, the wiring layer 142B, and the wiring layer 143B are formed by patterning the copper foil adhered on the front side and the back side of the insulating layer 144B.

The resonator 141B transmits electromagnetic waves between the resonator 141B and the resonator 123B1 of the resonance substrate 123B. The wiring layer 142B and the wiring layer 143B are maintained at ground potential. On the wiring layer 142B, a circuit device 150B is mounted via solder balls 151B. The substrate 140B is connected to the substrate 130B via the wiring layer 143B.

The circuit device 150A and the circuit device 150B are respectively connected to the substrate 140A and the substrate 140B via the solder balls 151A and the solder balls 151B, and fixed by an under-fill material 152A and an under-fill material 152B to be flip-chip mounted on the substrate 140A and the substrate 140B. The circuit device 150A and the circuit device 150B are respectively connected to the resonator 141A and the resonator 141B via transmission paths of the substrate 140A and the substrate 140B.

For example, the circuit device 150A and the circuit device 150B are transmitting and receiving devices for wireless communication, transmitting and receiving devices of video signals, etc., or processing units for performing predetermined arithmetic processing, and output signals radiated from the resonance device 120A and the resonance device 120B, respectively.

According to the wireless communication device 100 according to the first embodiment as described above, it is possible to transmit and receive signals between the resonator 121A1 of the wireless communication device 100A and the circuit device 150A of the electronic device 500A including the wireless communication device 100A.

Furthermore, it is possible to transmit and receive signals between the resonator 121B1 of the wireless communication device 100B and the circuit device 150B of the electronic device 500B including the wireless communication device 100B.

Therefore, by performing wireless communication between the resonator 121A1 of the resonance device 120A and the resonator 121B1 of the resonance device 120B in a state where the wireless communication device 100A and the wireless communication device 100B are closely-situated, it is possible to transmit and receive signals between the circuit device 150A and the circuit device 150B.

Figure 3:
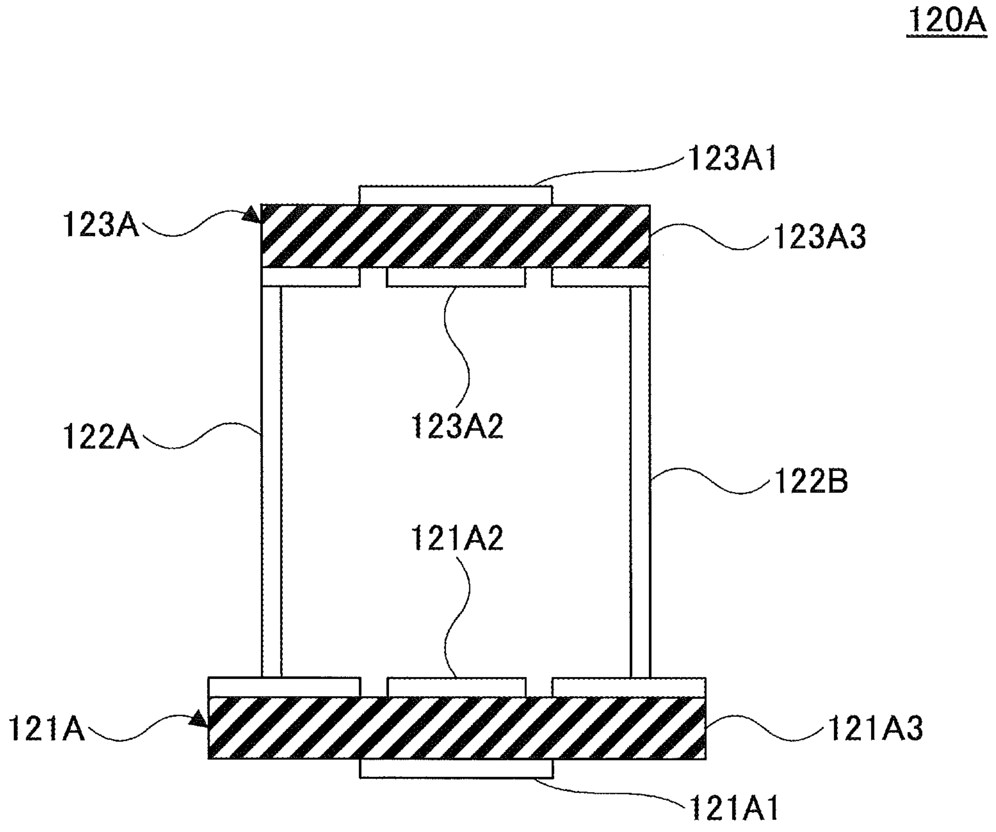
FIG. 3 illustrates a resonance device 120A of the wireless communication device 100 according to the first embodiment.
Figures 4A, 4B, 4C, 4D, 4E:
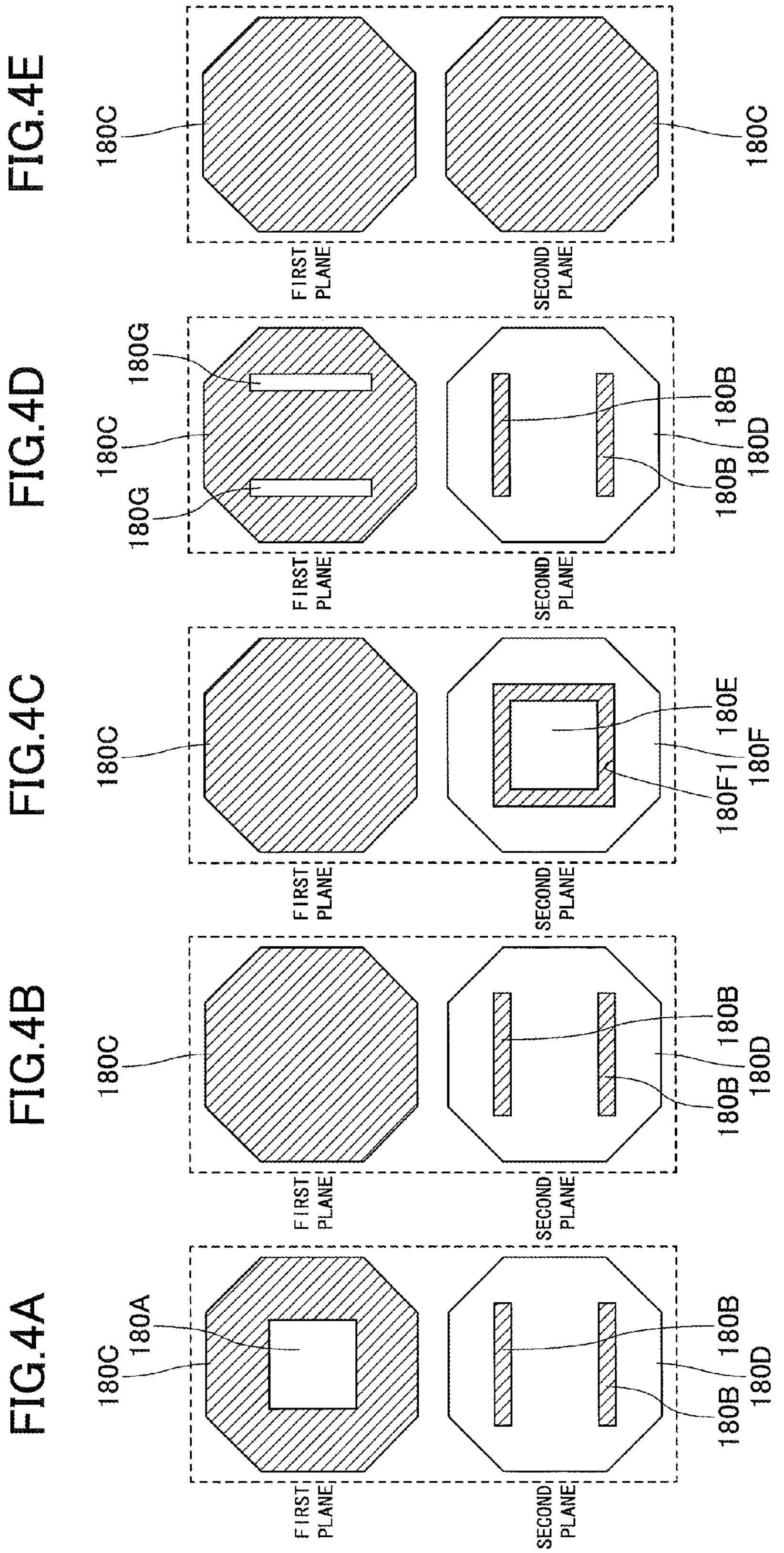
FIGS. 4A through 4E illustrate variations of plane patterns of a first plane and a second plane of the resonance device 120A.

Next, with reference to FIGS. 3 through 4E, a description is given of the resonance device 120A included in the wireless communication device 100 according to the first embodiment. The resonance device 120A and the resonance device 120B illustrated in FIG. 1 have the same configuration, and therefore a description is given of the resonance device 120A herein.

FIG. 3 illustrates the resonance device 120A of the wireless communication device 100 according to the first embodiment. FIGS. 4A through 4E illustrate variations of the plane patterns of a first plane and a second plane of the resonance device 120A.

The resonance device 120A illustrated in FIG. 3 is the same as the resonance device 120A illustrated in FIG. 1. The resonance device 120A includes the resonance substrate 121A, the waveguide tube 122A, and the resonance substrate 123A.

Here, a first plane means the plane on the side of the resonance substrate 121A opposite to the plane to which the waveguide tube 122A is connected, and the plane of the resonance substrate 123A on the side opposite to the plane to which the waveguide tube 122A is connected. That is to say, as for the resonance substrate 121A illustrated in FIG. 3, the resonator 121A1 is formed on the first plane, and as for the resonance substrate 123A illustrated in FIG. 3, the resonator 123A1 is formed on the first plane.

Furthermore, a second plane means the plane of the resonance substrate 121A to which the waveguide tube 122A is connected, and the plane of the resonance substrate 123A to which the waveguide tube 122A is connected. That is to say, as for the resonance substrate 121A illustrated in FIG. 3, the resonator 121A2 is formed on the second plane, and as for the resonance substrate 123A illustrated in FIG. 3, the resonator 123A2 is formed on the second plane.

FIGS. 4A through 4E illustrate variations of plane patterns of the first plane and the second plane of the resonance substrate 121A and the resonance substrate 123A.

Here, an insulating layer 180C illustrated in FIGS. 4A through 4E corresponds to the insulating layer 121A3 of the resonance substrate 121A, or the insulating layer 123A3 of the resonance substrate 123A.

In FIGS. 4A through 4E, the first plane illustrated in the top stage is the plane pattern of the first plane of the resonance substrate 121A and the resonance substrate 123A, and the second plane illustrated in the bottom stage is the plane pattern of the second plane of the resonance substrate 121A and the resonance substrate 123A.

Note that in FIGS. 4A through 4E, the metal film is illustrated by a white blank, and the insulator is illustrated by a hatching pattern.

As illustrated in FIG. 4A, on the first plane, a resonator may be provided by forming a metal patch 180A having a rectangular shape in a plan view on one side of the insulating layer 180C having an octagonal shape in a plan view. Furthermore, the second plane may be a resonator, in which a pair of slots 180B is formed in a metal layer 180D formed on the entire surface of the other side of the insulating layer 180C.

The slots 180B of the second plane are a pair of long and thin holes formed in the metal layer 180D formed on the entire surface of the insulating layer 180C, and the slots 180B are where the metal layer 180D is not formed. The interval between the two slots 180B is set to be half ($\lambda/2$) the length of the wavelength $\lambda$ in the communication frequency. The length of each of the two slots 180B in the longitudinal direction is preferably different from half ($\lambda/2$) the length of the wavelength $\lambda$ in the communication frequency. The width of each of the two slots 180B is to be set to an appropriate width according to the radiation properties of the resonator 121A2 and the resonator 123A2.

Note that the length of the vertical side of the metal patch 180A on the first plane as viewed in the figure may be set to be, for example, half (λ/2) the length of the wavelength λ in the communication frequency. The length of the vertical side of the metal patch 180A on the first plane as viewed in the figure corresponds to the interval between the slots 180B on the second plane. The length of the horizontal side of the metal patch 180A on the first plane as viewed in the figure is to be different from half (λ/2) the length of the wavelength λ in the communication frequency.

Furthermore, the center point of the metal patch 180A in a plan view and the center point of the pair of slots 180B in a plan view preferably match each other.

As described above, the resonator 121A1 of the resonance substrate 121A, or the resonator 123A1 of the resonance substrate 123A may be a resonator in which the metal patch 180A is formed on the insulating layer 180C, as in the first plane of FIG. 4A.

Furthermore, the resonator 121A2 of the resonance substrate 121A or the resonator 123A2 of the resonance substrate 123A may be a resonator in which the slots 180B are formed in the metal layer 180D formed on the entire surface of the insulating layer 180C, as in the second plane of FIG. 4A. The metal layer 180D may be handled as a ground element.

In this case, one end (top end as viewed in FIG. 1) and the other end (bottom end as viewed in FIG. 1) of the waveguide tube 122A are both connected to the metal layer 180D.

Furthermore, as illustrated in FIG. 4B, a metal layer does not have to be formed on the first plane. In this case, the first plane is covered by the insulating layer 180C, and there is no resonator on the first plane. Furthermore, the second plane may be a resonator in which a pair of slots 180B is formed in the metal layer 180D formed on the entire surface of the other side of the insulating layer 180C, similar to FIG. 4A.

As described above, the insulating layer 180C may be formed on the entire surface of the first plane of the resonance substrate 121A as illustrated in FIG. 4B, without providing the resonator 121A1 on the first plane of the resonance substrate 121A. Furthermore, the insulating layer 180C may be formed on the entire surface of the first plane of the resonance substrate 123A as illustrated in FIG. 4B, without providing the resonator 123A1 on the first plane of the resonance substrate 123A.

Furthermore, the resonator 121A2 of the resonance substrate 121A or the resonator 123A2 of the resonance substrate 123A may be a resonator in which the slots 180B are formed in the metal layer 180D formed on the entire surface of the insulating layer 180C, as in the second plane of FIG. 4B.

In this case, one end (top end as viewed in FIG. 1) and the other end (bottom end as viewed in FIG. 1) of the waveguide tube 122A are both connected to the metal layer 180D.

Furthermore, as illustrated in FIG. 4B, when there is no resonator on the first plane of the resonance substrate 121A, the resonance substrate 121A transmits electromagnetic waves between the resonance substrate 121A and the resonance substrate 123A, by the resonator 121A2 on the second plane.

Similarly, as illustrated in FIG. 4B, when there is no resonator on the first plane of the resonance substrate 123A, the resonance substrate 123A transmits electromagnetic waves between the resonance substrate 123A and the resonance substrate 121A, by the resonator 123A2 on the second plane.

Furthermore, as illustrated in FIG. 4C, a metal layer does not have to be formed on the first plane. In this case, the first plane is covered by the insulating layer 180C, and there is no resonator on the first plane similar to FIG. 4B.

Furthermore, the second plane may be a resonator formed by surrounding a metal patch 180E, which is formed on the other side of the insulating layer 180C, with a ground element 180F.

The metal patch 180E on the second plane has a rectangular shape in a plan view, which is formed in the center part on the other side of the insulating layer 180C. The metal patch 180E has the same shape as that of the metal patch 180A on the first plane in FIG. 4A.

Furthermore, the ground element 180F is formed around the metal patch 180E on the other side of the insulating layer 180C, and has an opening part 180F1 having a concentric rectangular shape with respect to the metal patch 180E. Note that the ground element 180F is referred to as a ground element in this example; however, the ground element 180F may be maintained at an arbitrary potential, such as a ground potential, a predetermined standard potential, or a floating potential.

As for the metal patch 180E on the second plane, for example, one of the length of the vertical side as viewed in the figure or the length of the horizontal side as viewed in the figure is to be set to half (λ/2) the length of the wavelength λ in the communication frequency. In this case, the length of the other side is preferably different from half (λ/2) the length of the wavelength λ in the communication frequency.

Furthermore, the center point of the metal patch 180E in a plan view and the center point of the ground element 180F in a plan view preferably match each other.

Furthermore, the gap where the insulating layer 180C is seen, between the metal patch 180E and the ground element 180F on the second plane, is preferable the same width of each slot in FIG. 4B.

As described above, the insulating layer 180C may be formed on the entire surface of the first plane of the resonance substrate 121A as illustrated in FIG. 4C, without providing the resonator 121A1 on the first plane of the resonance substrate 121A. Furthermore, the insulating layer 180C may be formed on the entire surface of the first plane of the resonance substrate 123A as illustrated in FIG. 4C, without providing the resonator 123A1 on the first plane of the resonance substrate 123A.

Furthermore, the resonator 121A2 of the resonance substrate 121A or the resonator 123A2 of the resonance substrate 123A may be a resonator in which the metal patch 180E and the ground element 180F are arranged as concentric rectangular shapes on the other side of the insulating layer 180C, as in the second plane of FIG. 4C.

In this case, one end (top end as viewed in FIG. 1) and the other end (bottom end as viewed in FIG. 1) of the waveguide tube 122A are both connected to the ground element 180F.

As illustrated in FIG. 4C, when there is no resonator on the first plane of the resonance substrate 121A, the resonance substrate 121A transmits electromagnetic waves between the resonance substrate 121A and the resonance substrate 123A, by the resonator 121A2 on the second plane.

Similarly, as illustrated in FIG. 4C, when there is no resonator on the first plane of the resonance substrate 123A, the resonance substrate 123A transmits electromagnetic waves between the resonance substrate 123A and the resonance substrate 121A, by the resonator 123A2 on the second plane.

As illustrated in FIG. 4D, on the first plane, a resonator may be provided, in which a pair of metal patches 180G having a long thin rectangular shape in a plan view is formed on one side of the insulating layer 180C having an octagonal shape in a plan view. Furthermore, the second plane may be a resonator in which the pair of slots 180B is formed in the metal layer 180D formed on the entire surface on the other side of the insulating layer 180C.

The pair of metal patches 180G on the first plane is formed in a direction that is different from that of the slots 180B on the second plane by 90 degrees in a plan view. That is to say, the pair of metal patches 180G and the pair of slots 180B are formed to be orthogonal with each other in a plan view.

The length of each of the two metal patches 180G in the longitudinal direction is set to be, for example, half ($\lambda/2$) the length of the wavelength $\lambda$ in the communication frequency. Furthermore, the width of each of the two metal patches 180G is to be set to an appropriate width according to the radiation properties of the resonator 121A1 and the resonator 123A1. Furthermore, the center point of the pair of metal patches 180G in a plan view and the center point of the pair of slots 180B in a plan view preferably match each other.

The slots 180B on the second plane are the same as the slots 180B illustrated in FIG. 4A.

As described above, the resonator 121A1 of the resonance substrate 121A, or the resonator 123A1 of the resonance substrate 123A may be a resonator in which the pair of metal patches 180G is formed on the insulating layer 180C, as in the first plane of FIG. 4D.

Furthermore, the resonator 121A2 of the resonance substrate 121A, or the resonator 123A2 of the resonance substrate 123A may be a resonator in which the pair of slots 180B is formed in the metal layer 180D formed on the entire surface of the insulating layer 180C, as in the second plane of FIG. 4D.

In this case, one end (top end as viewed in FIG. 1) and the other end (bottom end as viewed in FIG. 1) of the waveguide tube 122A are both connected to the metal layer 180D.

As illustrated in FIG. 4E, a metal layer does not have to be formed on the first plane. In this case, similar to FIGS. 4B and 4C, the first plane is covered by the insulating layer 180C. Furthermore, the second plane may also be covered by the insulating layer 180C, without forming a metal film on the second plane.

Furthermore, in the case of FIG. 4E, the thickness of the insulating layer 180C is set to half ($\lambda/2$) the length of the wavelength $\lambda$ in the communication frequency.

As described above, the resonator 121A1 of the resonance substrate 121A or the resonator 123A1 of the resonance substrate 123A may be a resonator in which the insulating layer 180C, whose thickness is set to be half ($\lambda/2$) the length of the wavelength $\lambda$, is formed on the entire surface, as in the first plane of FIG. 4E.

Furthermore, the resonator 121A2 of the resonance substrate 121A or the resonator 123A2 of the resonance substrate 123A may be a resonator in which the insulating layer 180C, whose thickness is set to be half ($\lambda/2$) the length of the wavelength $\lambda$, is formed on the entire surface, as in the second plane of FIG. 4E.

In this case, one end (top end as viewed in FIG. 1) and the other end (bottom end as viewed in FIG. 1) of the waveguide tube 122A are both connected to the insulating layer 180C.

As described above, the plane patterns of the first plane and the second plane of the resonance substrate 121A and the resonance substrate 123A of the resonance device 120A of the wireless communication device 100 according to the first embodiment may be, for example, the plane patterns as illustrated in FIGS. 4A through 4E.

Furthermore, the plane patterns of the first plane and the second plane of the resonance substrate 121B and the resonance substrate 123B of the resonance device 120B of the wireless communication device 100 may be the same as the plane patterns of the first plane and the second plane of the resonance substrate 121A and the resonance substrate 123A of the resonance device 120A.

Note that the plane patterns of the first plane and the second plane of the resonance substrate 121A and the resonance substrate 123A of the resonance device 120A, and the plane patterns of the first plane and the second plane of the resonance substrate 121B and the resonance substrate 123B may be different from each other.

Furthermore, the plane patterns of the first plane and the second plane of the resonance substrate 121A and the resonance substrate 123A of the resonance device 120A, and the plane patterns of the first plane and the second plane of the resonance substrate 121B and the resonance substrate 123B are not limited to patterns of resonators as illustrated in FIGS. 4A through 4E, but may be other patterns of resonators.

Figure 5:
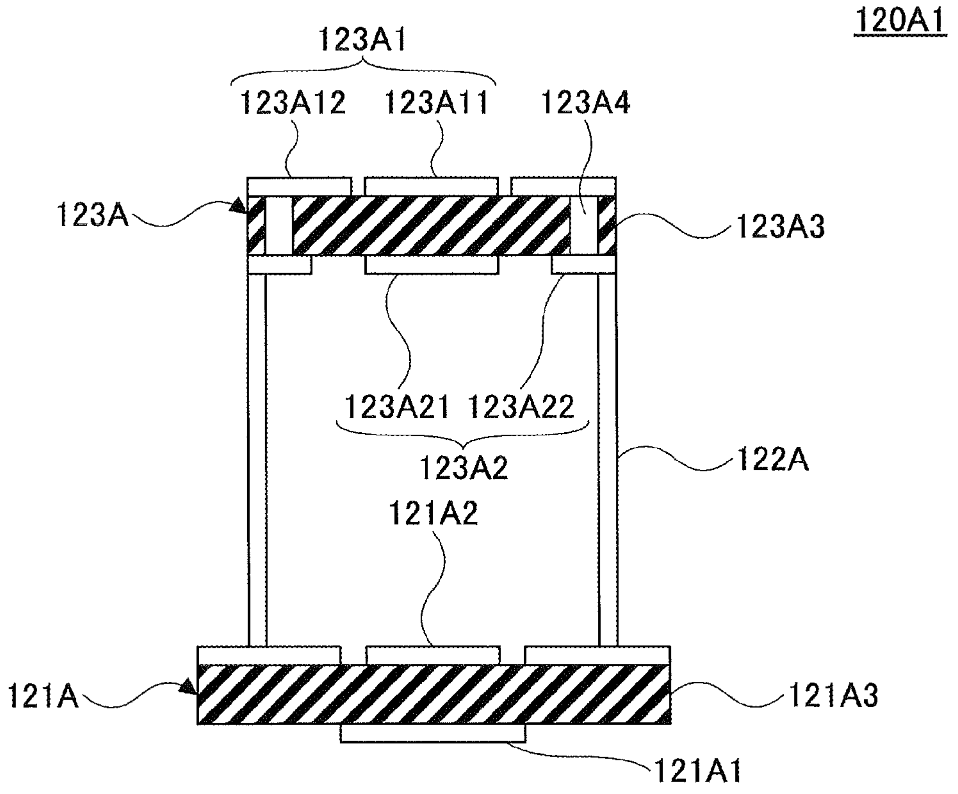
FIG. 5 illustrates a resonance device 120A1 of the wireless communication device 100 according to a modification example of the first embodiment.

Furthermore, the first plane and the second plane of the resonance substrate 123A of the resonance device 120A illustrated in FIG. 3 may be changed by using a via, for example, as illustrated in FIG. 5.

Figures 6A, 6B, 6C:
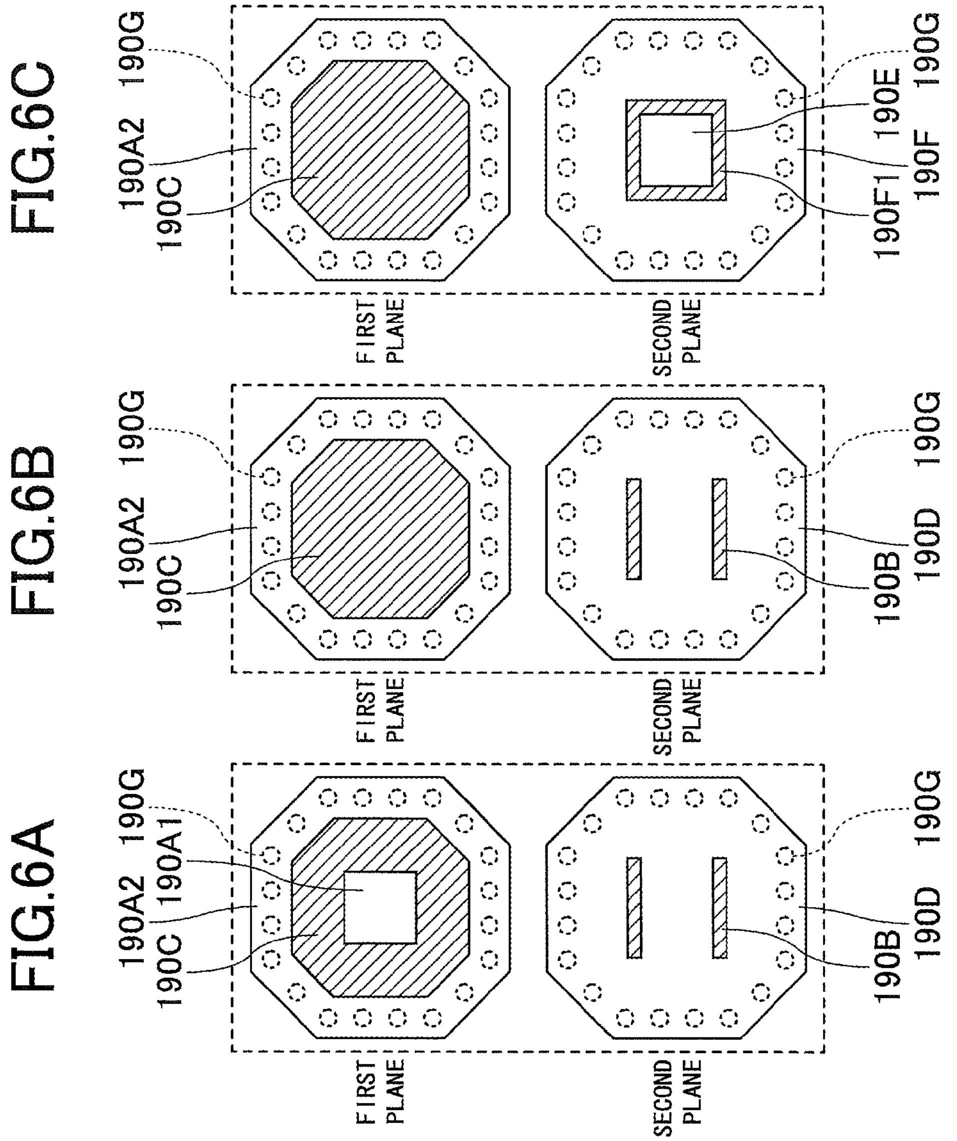
FIGS. 6A through 6C illustrate variations of plane patterns of a first plane and a second plane of a resonance substrate 123A of the resonance device 120A1 illustrated in FIG. 5.

FIG. 5 illustrates a resonance device 120A1 of the wireless communication device 100 according to a modification example of the first embodiment. Furthermore, FIGS. 6A through 6C illustrate variations of plane patterns of the first plane and the second plane of the resonance substrate 123A of the resonance device 120A1 illustrated in FIG. 5.

The resonance device 120A1 illustrated in FIG. 5 includes the resonance substrate 121A, the waveguide tube 122A, and the resonance substrate 123A. The resonance substrate 121A and the waveguide tube 122A illustrated in FIG. 5 are the same as the resonance substrate 121A and the waveguide tube 122A of the resonance device 120A illustrated in FIG. 3, respectively.

The resonance device 120A1 illustrated in FIG. 5 includes a resonance substrate 123A having a different configuration from that of the resonance substrate 123A illustrated in FIG. 3.

The resonance substrate 123A illustrated in FIG. 5 includes the resonator 123A1, the resonator 123A2, the insulating layer 123A3, and vias 123A4. The resonance substrate 123A illustrated in FIG. 5 has a configuration in which a ground element 123A12 is added to the first plane of the resonance substrate 123A illustrated in FIG. 3.

As illustrated in FIG. 5, the resonator 123A1 includes a metal patch 123A11 and the ground element 123A12 surrounding the metal patch 123A11 in a plan view. Furthermore, the resonator 123A2 includes a metal patch 123A21 and a ground element 123A22 surrounding the metal patch 123A21 in a plan view.

The ground element 123A22 of the resonator 123A2 is connected to the ground element 123A12 of the resonator 123A1 by the vias 123A4.

Next, with reference to FIGS. 6A through 6C, a description is given of plane patterns of the first plane and the second plane of the resonance substrate 123A. Here, the insulating layer 190C illustrated in FIGS. 6A through 6C corresponds to the insulating layer 123A3 of the resonance substrate 123A.

In FIGS. 6A through 6C, the first plane illustrated in the top stage is the plane pattern of the first plane of the resonance substrate 123A. Furthermore, the second plane illustrated in the bottom stage is the plane pattern of the second plane of the resonance substrate 123A.

Note that in FIGS. 6A through 6C, the metal film is illustrated by a white blank, and the insulator is illustrated by a hatching pattern.

As illustrated in FIG. 6A, on the first plane, a resonator may be provided, in which a metal patch 190A1 having a rectangular shape in a plan view and a ground element 190A2 having an octagonal ring shape in a plan view are formed on one side of an insulating layer 190C having an octagonal shape in a plan view.

Furthermore, the second plane may be a resonator in which a pair of slots 190B is formed in a metal film 190D formed on the entire surface of the other side of the insulating layer 190C.

Furthermore, the ground element 190A2 on the first plane and the metal film 190D on the second plane may be connected by vias 190G.

The length of the vertical side of the metal patch 190A1 on the first plane as viewed in the figure is to be set at, for example, half (λ/2) the length of the wavelength λ in the communication frequency. This is the same as the metal patch 180A illustrated in FIG. 4A. Furthermore, the center point of the metal patch 190A1 in a plan view and the center point of the pair of slots 190B in a plan view preferably match each other.

The slots 190B on the second plane are a pair of long, thin holes formed in the metal film 190D formed on the entire surface of the insulating layer 190C, and the slots 190B are where the metal film 190D is not formed. The length, the interval, and the width of the slots 190B are the same as the length, the interval, and the width of the slots 180B illustrated in FIG. 4A.

As described above, the resonator 123A1 of the resonance substrate 123A may be a resonator in which the metal patch 190A1 and the ground element 190A2 are formed on the insulating layer 190C, as in the first plane of FIG. 6A.

Furthermore, the resonator 123A2 of the resonance substrate 123A may be a resonator in which the slots 190B are formed in the metal film 190D formed on the entire surface of the insulating layer 190C, as in the second plane of FIG. 6A.

Furthermore, the ground element 190A2 of the first plane and the metal film 190D of the second plane may be connected by the vias 190G.

In this case, one end (top end as viewed in FIG. 1) of the waveguide tube 122A is connected to the metal film 190D. Note that the metal film 190D may be handled as a ground element.

Note that the first plane and the second plane of FIG. 6A may be interchanged.

Furthermore, as illustrated in FIG. 6B, on the first plane, only the ground element 190A2 having an octagonal ring shape in a plan view may be formed on one side of the insulating layer 190C having an octagonal shape in a plan view. The plane pattern on the first plane of FIG. 6B is formed by adding the ground element 190A2 to the plane pattern of FIG. 4B. Therefore, in the plane pattern of the first plane in FIG. 6B, there is no resonator.

Furthermore, the second plane may be a resonator in which the pair of slots 190B is formed in the metal film 190D formed on the entire surface of the other side of the insulating layer 190C.

Furthermore, the ground element 190A2 on the first plane and the metal film 190D on the second plane may be connected by the vias 190G.

That is to say, the resonator 123A1 may have a configuration in which the metal patch 190A1 is removed from the first plane of FIG. 6B.

As described above, on the first plane of the resonance substrate 123A, the ground element 190A2 may be formed on the insulating layer 190C, without providing the resonator 123A1, as in the first plane of FIG. 6B.

Furthermore, the resonator 123A2 of the resonance substrate 123A may be a resonator in which the slots 190B are formed in the metal film 190D formed on the other side of the insulating layer 190C, as in the second plane of FIG. 6B. The ground element 190A2 and the metal film 190D may be connected by the vias 190G. The vias 190G correspond to the vias 123A4 illustrated in FIG. 5.

In this case, one end (top end as viewed in FIG. 1) of the waveguide tube 122A is connected to the metal film 190D. Note that the metal film 190D may be handled as a ground element.

Furthermore, as illustrated in FIG. 6B, when there is no resonator on the first plane of the resonance substrate 123A, the resonance substrate 123A transmits electromagnetic waves between the resonance substrate 123A and the resonance substrate 121A, by the resonator 123A2 on the second plane.

Note that the first plane and the second plane of FIG. 6B may be interchanged.

Furthermore, as illustrated in FIG. 6C, the second plane may be a resonator that is formed by surrounding a metal patch 190E formed on the other side of the insulating layer 190C with a ground element 190F.

The metal patch 190E on the second plane is a metal patch having a rectangular shape in a plan view formed in the center part of the other side of the insulating layer 190C, and has the same shape as the metal patch 180E on the second plane illustrated in FIG. 4C.

Furthermore, the ground element 190F surrounds the metal patch 190E on the other side of the insulating layer 190C, and includes an opening part 190F1 having a concentric rectangular shape with respect to the metal patch 190E.

The length of the side of the metal patch 190E on the second plane is to be the same as the length of the side of the metal patch 180E illustrated in FIG. 4C. Furthermore, the center point of the metal patch 190E in a plan view and the center point of the ground element 190F in a plan view preferably match each other.

In this case, one end (top end as viewed in FIG. 1) of the waveguide tube 122A is connected to the ground element 190F.

As described above, on the first plane of the resonance substrate 123A, the ground element 190A2 may be formed on the insulating layer 190C, without providing the resonator 123A1, as in the first plane of FIG. 6C.

Furthermore, the resonator 123A2 of the resonance substrate 123A may be a resonator in which the metal patch 190E and the ground element 190F are arranged as concentric rectangles on the other side of the insulating layer 190C, as in the second plane of FIG. 6C. The ground element 190A2 and the ground element 190F may be connected by the vias 190G. The vias 190G correspond to the vias 123A4 illustrated in FIG. 5.

Furthermore, as illustrated in FIG. 6C, when there is no resonator on the first plane of the resonance substrate 123A, the resonance substrate 123A transmits electromagnetic waves between the resonance substrate 123A and the resonance substrate 121A, by the resonator 123A2 on the second plane.

Note that the first plane and the second plane of FIG. 6C may be interchanged.

Next, with reference to FIGS. 7A through 11B, a description is given of the structures of the substrate 140A and the substrate 140B of the wireless communication device 100 according to the first embodiment. The substrate 140A and the substrate 140B have the same configuration, and therefore a description is given of the substrate 140A herein.

FIGS. 7A through 11B illustrate structures of the substrates 140A1 through 140A4 of the wireless communication device 100 according to the first embodiment. The substrate 140A illustrated in FIG. 1 may be, for example, any one of the substrates 140A1 through 140A4 illustrated in FIGS. 7A through 11B. In FIGS. 7A through 11B, figure numbers accompanied by "A" are plan views and figure numbers accompanied by "B" are cross-sectional views cut along A1-A1 through A4-A4 of the corresponding figures accompanied by "A" and viewed from the arrow direction.

Note that in FIGS. 7A through 11B, in order to facilitate visualization of the structure, the solder balls 151 and the under-fill material 152 (see FIG. 1) are omitted. Furthermore, in FIGS. 7A through 11B, an XYZ coordinate system is defined, which is an orthogonal coordinate system, as illustrated. Furthermore, in FIGS. 7A, 8A, 9A, 10A, and 11A, the metal film is illustrated by a white blank, and the insulator is illustrated by a hatching pattern. Furthermore, the solder balls 151 may be metal bumps.

Figure 7A:
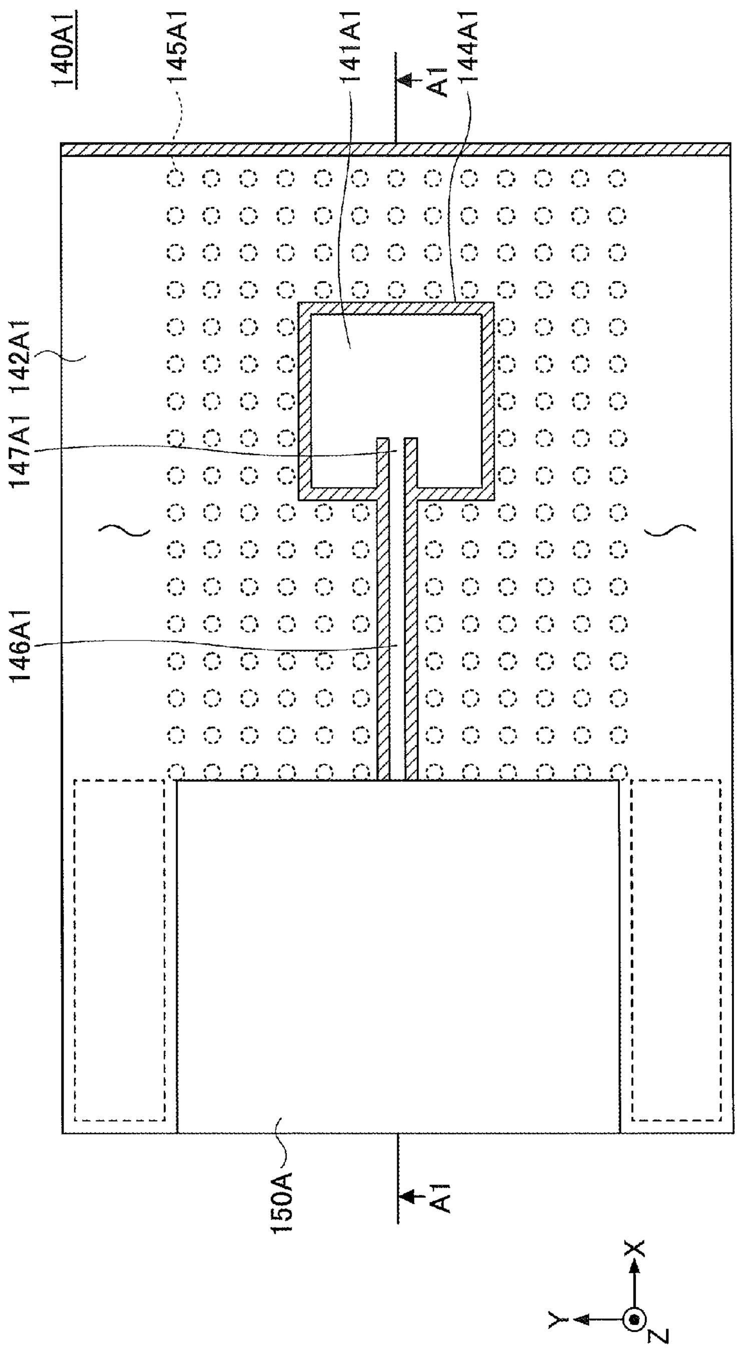
FIGS. 7A and 7B illustrate a structure of a substrate 140A1 of the wireless communication device 100 according to the first embodiment.
Figure 7B:
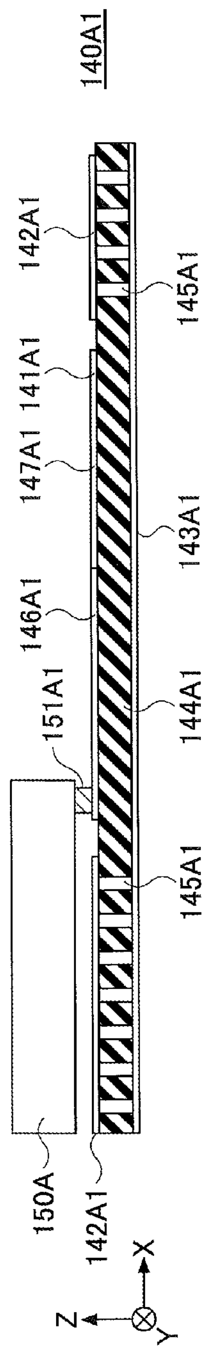

As illustrated in FIGS. 7A and 7B, a substrate 140A1 includes a resonator 141A1, a wiring layer 142A1, a wiring layer 143A1, an insulating layer 144A1, vias 145A1, a coplanar line (CPW: Coplanar Waveguide) 146A1, and a connecting channel 147A1.

The resonator 141A1 is a metal patch having a rectangular shape in a plan view, and has the coplanar line 146A1 connected to the center of the side on the X-axis negative direction side of the resonator 141A1 via the connecting channel 147A1. The connecting channel 147A1 is a part that enters inside of the metal patch of the resonator 141A1 having a rectangular shape in a plan view. The connecting channel 147A1 is formed to achieve impedance-matching between the coplanar line 146A1 and the resonator 141A1.

For example, the resonator 141A1 is formed together with the coplanar line 146A1, the connecting channel 147A1, and the wiring layer 142A1, by patterning copper foil formed on the surface of the insulating layer 144A1 on the Z-axis positive direction side.

The wiring layer 142A1 is maintained at a ground potential, and functions as a ground element.

The wiring layer 142A1 is formed to surround the resonator 141A1 in a plan view, and is formed along both sides of the coplanar line 146A1, on the surface of the insulating layer 144A1 on the Z-axis positive direction side.

Furthermore, the wiring layer 142A1 is also formed on the part positioned under the circuit device 150A. That is to say, the wiring layer 142A1 is formed to cover substantially the entire surface of the substrate 140A1, except for the resonator 141A1 and the coplanar line 146A1. Furthermore, the wiring layer 142A1 is connected to the wiring layer 143A1 via the vias 145A1. The wiring layer 142A1 and the wiring layer 143A1 are maintained at ground potential.

The wiring layer 143A1 is formed on the entire surface of the insulating layer 144A1 on the Z-axis negative direction side. The wiring layer 143A1 is connected to the wiring layer 142A1 by the vias 145A1, and is maintained at ground potential.

The insulating layer 144A1 is formed by, for example, impregnating glass fiber with an epoxy resin, when the substrate 140A1 is a printed circuit board conforming to the FR-4 specification. Here, a wiring layer in the inner layer of the insulating layer 144A1 is not illustrated; however, a wiring layer that is an inner layer may be formed in the insulating layer 144A1.

The vias 145A1 connect the wiring layer 142A1 and the wiring layer 143A1. Multiple vias 145A1 are formed, such that the wiring layer 142A1 and the wiring layer 143A1 are connected across the entire surfaces in a plan view.

The vias 145A1 are formed around the resonator 141A1 having a rectangular shape in a plan view, on both sides of the coplanar line 146A1, under the circuit device 150A, etc. The "~" symbols on the Y-axis positive direction side and on the Y-axis negative direction side of the vias 145A1 in FIG. 7A indicate that the vias 145A1 are formed up to the edge parts of the wiring layer 142A1 in the Y-axis positive direction side and on the Y-axis negative direction side.

Note that in the areas indicated by dashed lines on the Y-axis positive direction side and on the Y-axis negative direction side of the circuit device 150A, terminals, etc., of the circuit device 150A are formed, and therefore the vias 145A1 are not formed.

The pitch of the multiple vias 145A1 is set, for example, such that the interval between vias 145A1 adjacent to each other is less than half the wavelength λ in the communication frequency of wireless communication, more preferably less than or equal to λ/4.

The pitch is set as described above for the purpose of trapping the electromagnetic waves transmitted between the circuit device 150A and the resonator 141A1 via the coplanar line 146A1, in a transmission path realized by the coplanar line 146A1. That is to say, the pitch is set to prevent the electromagnetic waves from leaking out of the coplanar line 146A1 and from being transmitted inside the insulating layer 144A1.

As for the coplanar line 146A1, the end part on the X-axis positive direction side is connected to the resonator 141A1, and the end part on the X-axis negative direction side is connected to the terminal of the circuit device 150A via a bump 151A1. The coplanar line 146A1 is an example of a first transmission path. Furthermore, a coplanar line formed in the substrate 140B similar to the coplanar line 146A1 is an example of a second transmission path.

The coplanar line 146A1 is a transmission path having a characteristic impedance of 50Ω, and is provided to suppress the reduction in the transmission efficiency of signals between the resonator 141A1 and the circuit device 150A.

The coplanar line 146A1 is formed on the center axis extending in the X-axis direction of the substrate 140A1. For example, the coplanar line 146A1 is formed together with the resonator 141A1 and the wiring layer 142A1, by patterning copper foil formed on the surface of the insulating layer 144A1 on the Z-axis positive direction side.

The coplanar line 146A1 is present in a section along the X-axis direction, where the wiring layer 142A1 is present on the Y-axis positive direction side and the on the Y-axis negative direction side.

Therefore, the end part of the coplanar line 146A1 on the X-axis positive direction side is connected to the resonator 141A1 via the connecting channel 147A1.

The connecting channel 147A1 is the part that enters inside the metal patch of the resonator 141A1 having a rectangular shape in a plan view. The connecting channel 147A1 is formed to achieve impedance-matching between the coplanar line 146A1 and the resonator 141A1. Note that the connecting channel 147A1 may be regarded as part of the resonator 141A1.

As described above, in the substrate 140A1 illustrated in FIGS. 7A and 7B, a transmission line realized by the coplanar line 146A1 is formed between the resonator 141A1 and the circuit device 150A.

Therefore, signals output from the circuit device 150A via the bump 151A1 are transmitted through the coplanar line 146A1 and the connecting channel 147A1 to the resonator 141A1.

Furthermore, the signals input to the resonator 141A1 are transmitted through the connecting channel 147A1 and the coplanar line 146A1 to the circuit device 150A.

Figure 8A:
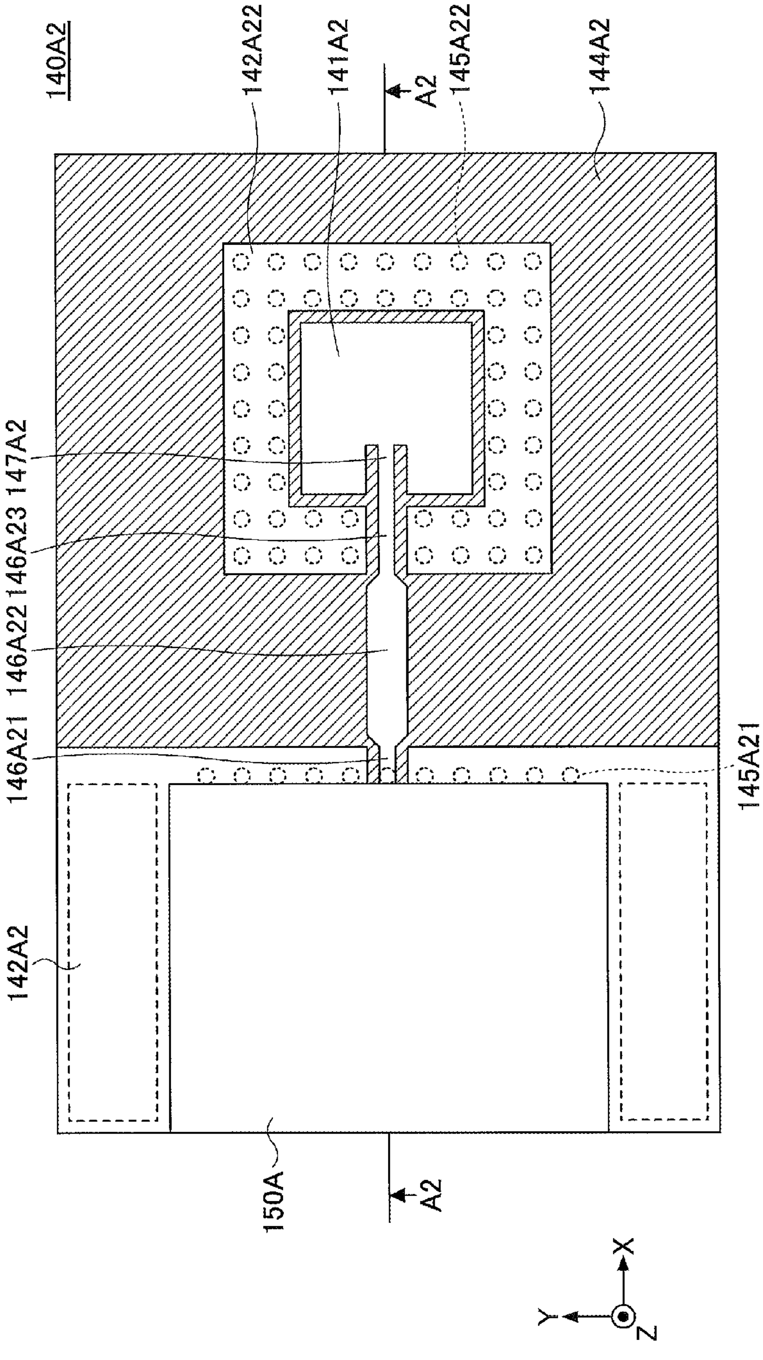
FIGS. 8A and 8B illustrate a structure of a substrate 140A2 of the wireless communication device 100 according to the first embodiment.
Figure 8B:
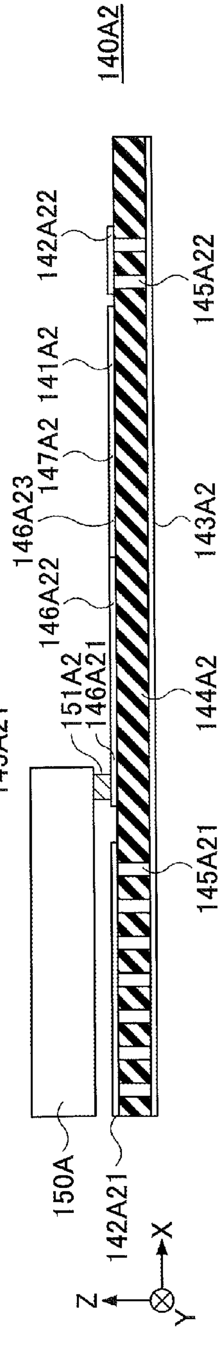

Next, a description is given of a substrate 140A2 illustrated in FIGS. 8A and 8B.

FIG. 8B is a cross-sectional view cut along A2-A2 of FIG. 8A and viewed from the arrow direction. The cross section cut along A2-A2 is the cross section on the center axis extending in the X axis direction of the substrate 140A2 illustrated in FIG. 8A.

As illustrated in FIGS. 8A and 8B, the substrate 140A2 includes a resonator 141A2, a wiring layer 142A21, a wiring layer 142A22, a wiring layer 143A2, an insulating layer 144A2, vias 145A21, vias 145A22, a coplanar line 146A21, a microstrip line 146A22, a coplanar line 146A23, and a connecting channel 147A2.

The coplanar line 146A21, the microstrip line 146A22, and the coplanar line 146A23 are examples of a first transmission path. Furthermore, a coplanar line, a microstrip line, and a coplanar line that are similarly formed on the substrate 140B (FIG. 1) are examples of a second transmission path.

The resonator 141A2 is a metal patch having a rectangular shape in a plan view, and has the coplanar line 146A23 connected to the center of the side on the X-axis negative direction side of the resonator 141A2 via the connecting channel 147A2. The connecting channel 147A2 is a part that enters inside of the metal patch of the resonator 141A2 having a rectangular shape in a plan view. The connecting channel 147A1 is formed to achieve impedance-matching between the coplanar line 146A23 and the resonator 141A2.

For example, the resonator 141A2 is formed together with the coplanar line 146A21, the microstrip line 146A22, the coplanar line 146A23, the connecting channel 147A2, the wiring layer 142A21, and the wiring layer 142A22, by patterning copper foil formed on the surface of the insulating layer 144A2 on the Z-axis positive direction side.

The wiring layer 142A21 is formed under the circuit device 150A, on the Y-axis positive direction side and on the Y-axis negative direction side of the circuit device 150A, and on the X-axis positive direction side of the circuit device 150A. The wiring layer 142A21 is connected to the wiring layer 143A2 via the vias 145A21. The wiring layer 142A21 and the wiring layer 143A2 are maintained at ground potential.

The wiring layer 142A22 is maintained at ground potential, and functions as a ground element.

The wiring layer 142A22 is separated from the wiring layer 142A21. The wiring layer 142A22 is not formed in the section where the microstrip line 146A22 is formed, in the X-axis direction.

The wiring layer 142A22 surrounds the resonator 141A2 in a plan view, and is formed along both sides of the coplanar line 146A23, on the surface of the insulating layer 144A2 on the Z-axis positive direction side. The wiring layer 142A22 is connected to the wiring layer 143A2 via the vias 145A22.

The wiring layer 143A2 is formed on the entire surface of the insulating layer 144A2 on the Z-axis negative direction side. The wiring layer 143A2 is connected to the wiring layer 142A21 by the vias 145A21, and is also connected to the wiring layer 142A22 by the vias 145A22, and is maintained at ground potential.

The insulating layer 144A2 is an insulating layer formed by, for example, impregnating glass fiber with an epoxy resin, when the substrate 140A2 is a printed circuit board conforming to the FR-4 specification. Here, a wiring layer in the inner layer of the insulating layer 144A2 is not illustrated; however, a wiring layer that is an inner layer may be formed in the insulating layer 144A2.

The vias 145A21 connect the wiring layer 142A21 and the wiring layer 143A2. The vias 145A21 also connect the wiring layer 142A21 and the wiring layer 143A2 below the circuit device 150A. Multiple vias 145A21 are formed, such that the wiring layer 142A21 and the wiring layer 143A2 are connected across the entire surfaces in a plan view.

Note that in the areas indicated by dashed lines on the Y-axis positive direction side and on the Y-axis negative direction side of the circuit device 150A, terminals, etc., of the circuit device 150A are formed, and therefore the vias 145A21 are not formed.

The pitch of the multiple vias 145A21 is set, for example, such that the interval between vias 145A21 adjacent to each other is less than half the wavelength λ in the communication frequency of wireless communication, more preferably less than or equal to λ/4.

The pitch is set as described above for the purpose of trapping the electromagnetic waves transmitted by the coplanar line 146A21, in a transmission path realized by the coplanar line 146A21. That is to say, the pitch is set to prevent the electromagnetic waves from leaking out of the coplanar line 146A21.

As the vias 145A22 are formed between the wiring layer 142A22 and the wiring layer 143A2, the vias 145A22 are formed to surround the resonator 141A2 having a rectangular shape in a plan view and on both sides of the coplanar line 146A23.

The pitch of the multiple vias 145A22 is set, for example, such that the interval between vias 145A22 adjacent to each other is less than half the wavelength λ in the communication frequency of wireless communication, more preferably less than or equal to λ/4.

The pitch is set as described above for the purpose of trapping the electromagnetic waves transmitted by the coplanar line 146A23, in a transmission path realized by the coplanar line 146A23. That is to say, the pitch is set to prevent the electromagnetic waves from leaking out of the coplanar line 146A23.

As for the coplanar line 146A21, the end part on the X-axis positive direction side is connected to the microstrip line 146A22, and the end part on the X-axis negative direction side is connected to the terminal of the circuit device 150A via a bump 151A2. The coplanar line 146A21 is a transmission path having a characteristic impedance of 50Ω, and is provided to suppress the reduction in the transmission efficiency of signals between the microstrip line 146A22 and the circuit device 150A.

The coplanar line 146A21 is formed on the center axis extending in the X-axis direction of the substrate 140A2. For example, the coplanar line 146A21 is formed together with the microstrip line 146A22, the coplanar line 146A23, the connecting channel 147A2, the resonator 141A2, the wiring layer 142A21, and the wiring layer 142A22, by patterning copper foil formed on the surface of the insulating layer 144A2 on the Z-axis positive direction side.

The coplanar line 146A21 is sandwiched by the wiring layer 142A21 on the Y-axis positive direction side and on the Y-axis negative direction side.

As for the microstrip line 146A22, the end on the X-axis negative direction side is connected to the coplanar line 146A21 and the end on the X-axis positive direction side is connected to the coplanar line 146A23.

The microstrip line 146A22 is a transmission path having a characteristic impedance of 50Ω, and is provided to suppress the reduction in the transmission efficiency of signals between the coplanar line 146A21 and the coplanar line 146A23.

As for the coplanar line 146A23, the end on the X-axis positive direction side is connected to the resonator 141A2 via the connecting channel 147A2, and the end on the X-axis negative direction side is connected to the microstrip line 146A22.

The coplanar line 146A23 is a transmission path having a characteristic impedance of 50Ω, and is provided to suppress the reduction in the transmission efficiency of signals between the resonator 141A2 and the microstrip line 146A22.

The coplanar line 146A23 is formed on the center axis extending in the X-axis direction of the substrate 140A2. For example, the coplanar line 146A23 is formed together with the coplanar line 146A21, the microstrip line 146A22, the connecting channel 147A2, the resonator 141A2, the wiring layer 142A21, and the wiring layer 142A22, by patterning copper foil formed on the surface of the insulating layer 144A2 on the Z-axis positive direction side.

The coplanar line 146A23 is present in a section along the X-axis direction, where the wiring layer 142A2 is present on the Y-axis positive direction side and the on the Y-axis negative direction side.

Therefore, the end part of the coplanar line 146A23 on the X-axis positive direction side is connected to the resonator 141A2 via the connecting channel 147A2.

The connecting channel 147A2 is the part that enters inside the metal patch of the resonator 141A2 having a rectangular shape in a plan view. The connecting channel 147A2 is formed to achieve impedance-matching between the coplanar line 146A23 and the resonator 141A2. Note that the connecting channel 147A2 may be regarded as part of the resonator 141A2.

As described above, in the substrate 140A2 illustrated in FIGS. 8A and 8B, between the resonator 141A2 and the circuit device 150A, a transmission path is formed, which is realized by the coplanar line 146A21, the microstrip line 146A22, and the coplanar line 146A23.

Therefore, signals output from the circuit device 150A via the bump 151A2 are transmitted through the coplanar line 146A21, the microstrip line 146A22, the coplanar line 146A23, the connecting channel 147A2, and to the resonator 141A2.

Furthermore, the signals input to the resonator 141A2 are transmitted through the connecting channel 147A2, the coplanar line 146A23, the microstrip line 146A22, the coplanar line 146A21, and to the circuit device 150A.

Figure 9A:
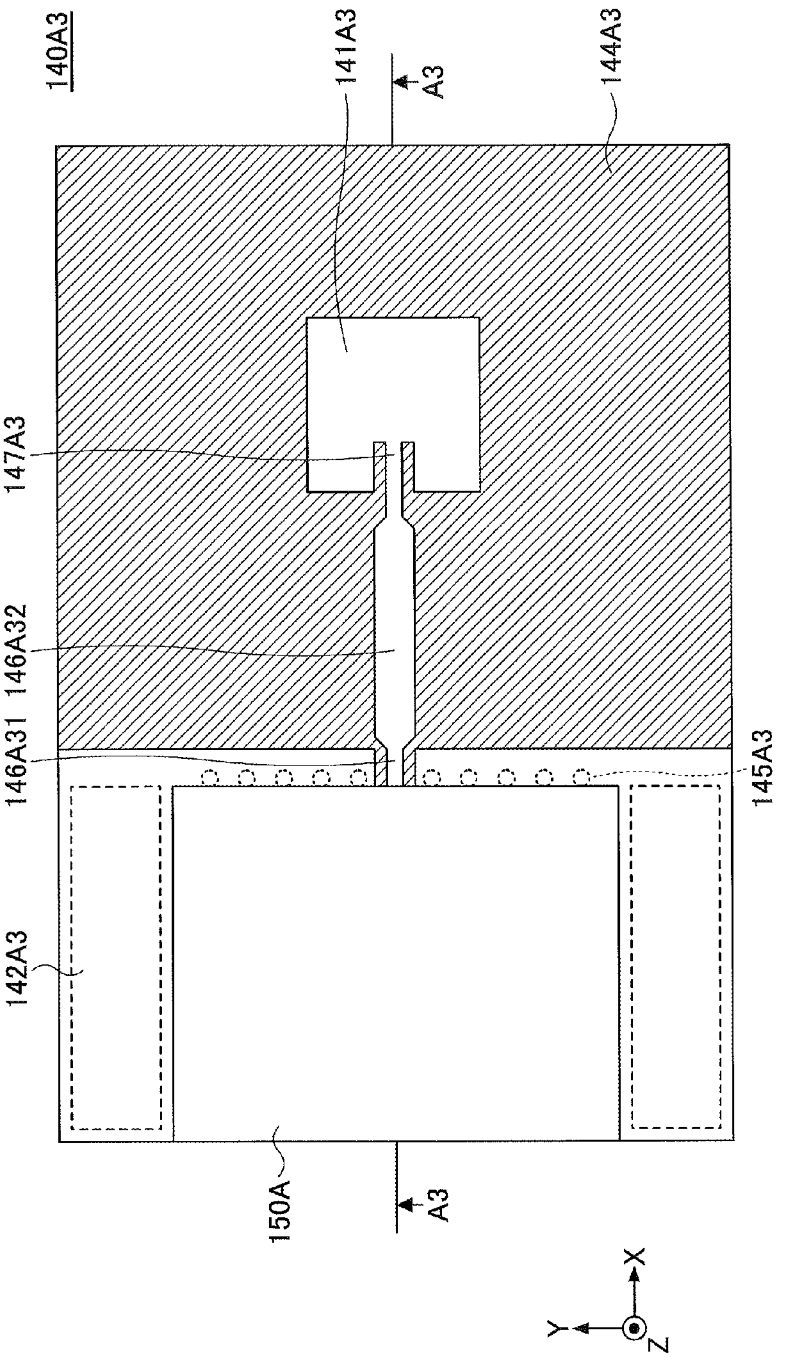
FIGS. 9A and 9B illustrate a structure of a substrate 140A3 of the wireless communication device 100 according to the first embodiment.
Figure 9B:
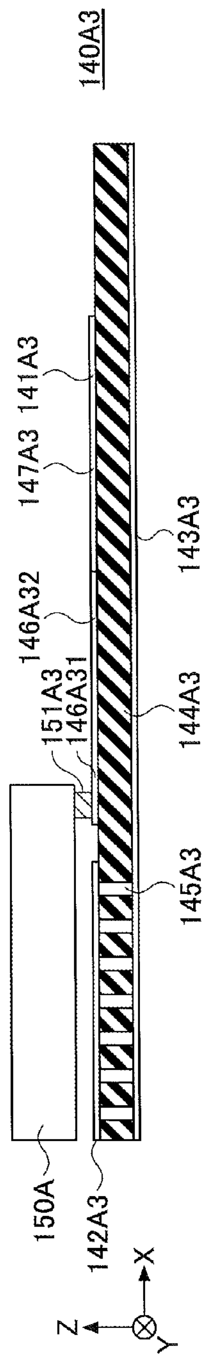

Next, a description is given of a substrate 140A3 illustrated in FIGS. 9A and 9B.

FIG. 9B is a cross-sectional view cut along A3-A3 of FIG. 9A and viewed from the arrow direction. The cross section cut along A3-A3 is the cross section on the center axis extending in the X axis direction of the substrate 140A3 illustrated in FIG. 9A.

As illustrated in FIGS. 9A and 9B, the substrate 140A3 includes a resonator 141A3, a wiring layer 142A3, a wiring layer 143A3, an insulating layer 144A3, vias 145A3, a coplanar line 146A31, a microstrip line 146A32, and a connecting channel 147A3.

The coplanar line 146A31 and the microstrip line 146A32 are examples of a first transmission path. Furthermore, similarly, a coplanar line and a microstrip line formed on the substrate 140B (FIG. 1) are examples of a second transmission path.

The substrate 140A3 illustrated in FIGS. 9A and 9B has a configuration in which the wiring layer 142A22 and the vias 145A22 are removed from the substrate 140A2 illustrated in FIGS. 8A and 8B.

The resonator 141A3 is a metal patch having a rectangular shape in a plan view, and has the microstrip line 146A32 connected to the center of the side on the X-axis negative direction side of the resonator 141A3 via the connecting channel 147A3. The connecting channel 147A3 is a part that enters inside of the metal patch of the resonator 141A3 having a rectangular shape in a plan view. The connecting channel 147A3 is formed to achieve impedance-matching between the microstrip line 146A32 and the resonator 141A3.

For example, the resonator 141A3 is formed together with the coplanar line 146A31, the microstrip line 146A32, the connecting channel 147A3, and the wiring layer 142A3, by patterning copper foil formed on the surface of the insulating layer 144A3 on the X-axis positive direction side.

Similar to the wiring layer 142A21 illustrated in FIGS. 8A and 8B, the wiring layer 142A3 is formed under the circuit device 150A, on the Y-axis positive direction side and on the Y-axis negative direction side of the circuit device 150A, and on the X-axis positive direction side of the circuit device 150A. The wiring layer 142A3 is connected to the wiring layer 143A3 via the vias 145A3. The wiring layer 142A3 and the wiring layer 143A3 are maintained at ground potential.

Similar to the wiring layer 143A2 illustrated in FIGS. 8A and 8B, the wiring layer 143A3 is formed on the entire surface of the insulating layer 144A3 on the Z-axis negative direction side. The wiring layer 143A3 is connected to the wiring layer 142A3 by the vias 145A3, and is maintained at ground potential.

Similar to the insulating layer 144A2 illustrated in FIGS. 8A and 8B, the insulating layer 144A3 is an insulating layer formed by, for example, impregnating glass fiber with an epoxy resin, when the substrate 140A3 is a printed circuit board conforming to the FR-4 specification. Here, a wiring layer in the inner layer of the insulating layer 144A3 is not illustrated; however, a wiring layer that is an inner layer may be formed in the insulating layer 144A3.

Similar to the vias 145A21 illustrated in FIGS. 8A and 8B, the vias 145A3 connect the wiring layer 142A3 and the wiring layer 143A3. The vias 145A3 also connect the wiring layer 142A3 and the wiring layer 143A3 below the circuit device 150A. Multiple vias 145A3 are formed, such that the wiring layer 142A3 and the wiring layer 143A3 are connected across the entire surfaces in a plan view.

Note that in the areas indicated by dashed lines on the Y-axis positive direction side and on the Y-axis negative direction side of the circuit device 150A, terminals, etc., of the circuit device 150A are formed, and therefore the vias 145A3 are not formed.

The pitch of the multiple vias 145A3 is set, for example, such that the interval between vias 145A3 adjacent to each other is less than half the wavelength λ in the communication frequency of wireless communication, more preferably less than or equal to λ/4.

The pitch is set as described above for the purpose of trapping the electromagnetic waves transmitted by the coplanar line 146A31, in a transmission path realized by the coplanar line 146A31. That is to say, the pitch is set to prevent the electromagnetic waves from leaking out of the coplanar line 146A31.

Similar to the coplanar line 146A21 illustrated in FIGS. 8A and 8B, as for the coplanar line 146A31, the end part on the X-axis positive direction side is connected to the microstrip line 146A32, and the end part on the X-axis negative direction side is connected to the terminal of the circuit device 150A via a bump 151A3. The coplanar line 146A31 is a transmission path having a characteristic impedance of 50Ω, and is provided to suppress the reduction in the transmission efficiency of signals between the microstrip line 146A32 and the circuit device 150A.

The coplanar line 146A31 is formed on the center axis extending in the X-axis direction of the substrate 140A3. For example, the coplanar line 146A31 is formed together with the microstrip line 146A32, the connecting channel 147A3, the resonator 141A3, and the wiring layer 142A3, by patterning copper foil formed on the surface of the insulating layer 144A3 on the Z-axis positive direction side.

The coplanar line 146A31 is sandwiched by the wiring layer 142A3 on the Y-axis positive direction side and on the Y-axis negative direction side.

As for the microstrip line 146A32, the end on the X-axis negative direction side is connected to the coplanar line 146A31 and the end on the X-axis positive direction side is connected to the connecting channel 147A3.

The microstrip line 146A32 is a transmission path having a characteristic impedance of 50Ω, and is provided to suppress the reduction in the transmission efficiency of signals between the coplanar line 146A31 and the connecting channel 147A3.

The connecting channel 147A3 is the part that enters inside the metal patch of the resonator 141A3 having a rectangular shape in a plan view. The connecting channel 147A3 is formed to achieve impedance-matching between the microstrip line 146A32 and the resonator 141A3. Note that the connecting channel 147A3 may be regarded as part of the resonator 141A3.

As described above, in the substrate 140A3 illustrated in FIGS. 9A and 9B, between the resonator 141A3 and the circuit device 150A, a transmission path is formed, which is realized by the coplanar line 146A31 and the microstrip line 146A32.

Therefore, signals output from the circuit device 150A via the bump 151A3 are transmitted through the coplanar line 146A31, the microstrip line 146A32, the connecting channel 147A3, and to the resonator 141A3.

Furthermore, the signals input to the resonator 141A3 are transmitted through the connecting channel 147A3, the microstrip line 146A32, the coplanar line 146A31, and to the circuit device 150A.

Next, a description is given of a substrate 140A4 illustrated in FIGS. 10A through 11B.

Figure 10A:
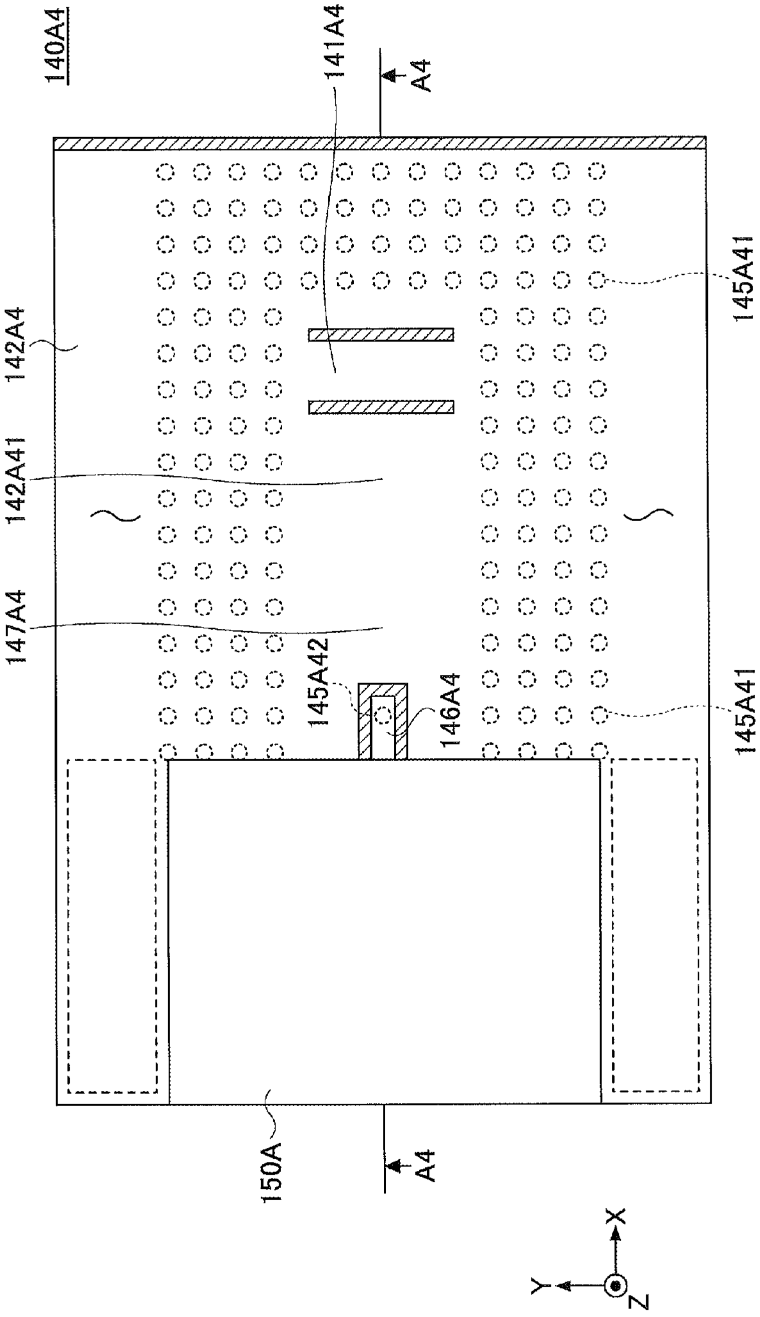
FIGS. 10A and 10B illustrate a structure of a substrate 140A4 of the wireless communication device 100 according to the first embodiment.
Figure 10B:
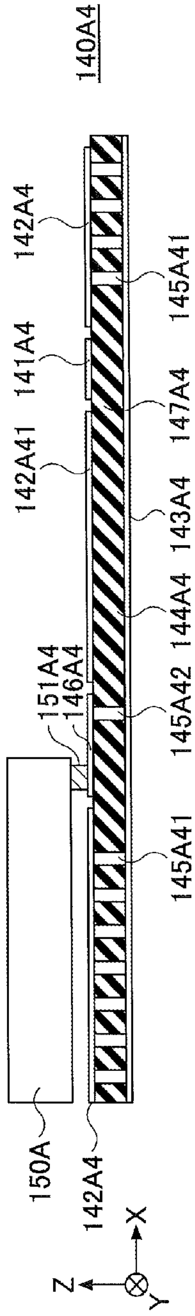
Figure 11A:
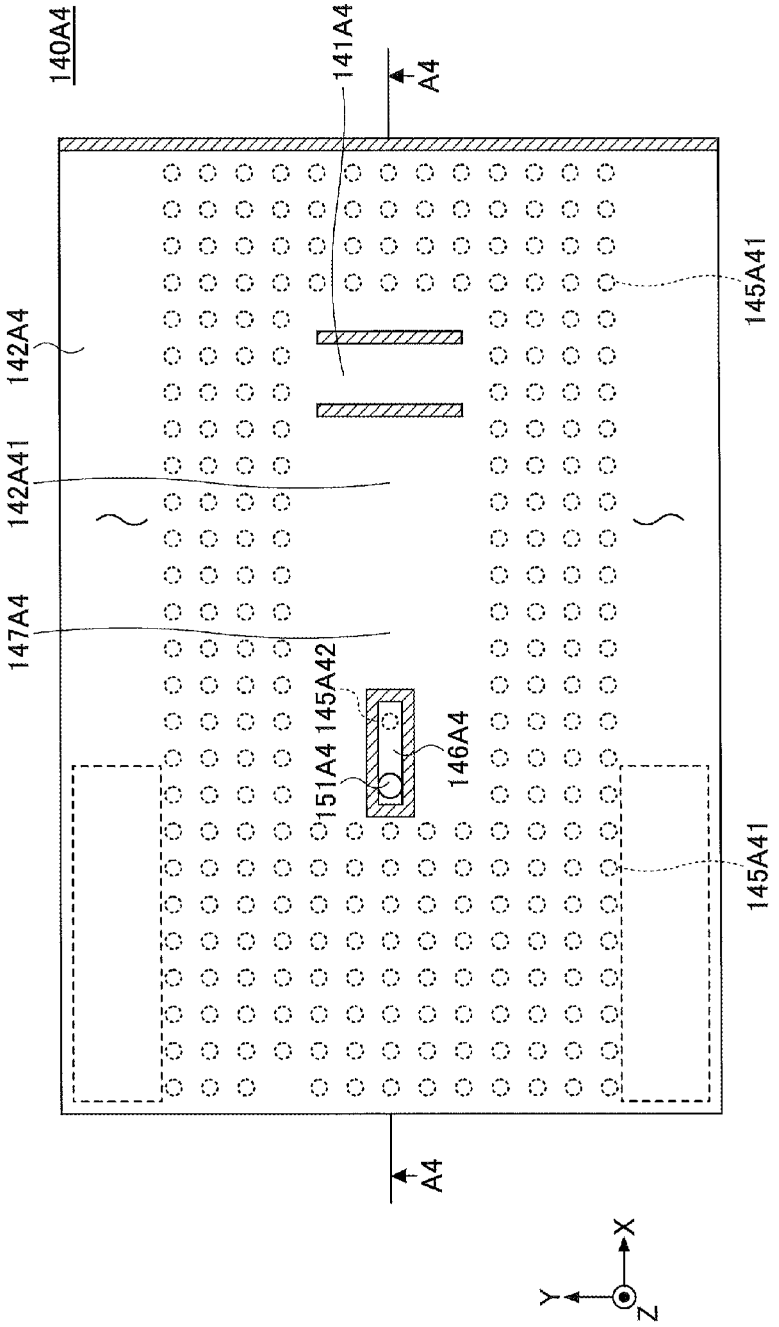
FIGS. 11A and 11B illustrate a structure of a substrate 140A4 of the wireless communication device 100 according to the first embodiment.
Figure 11B:
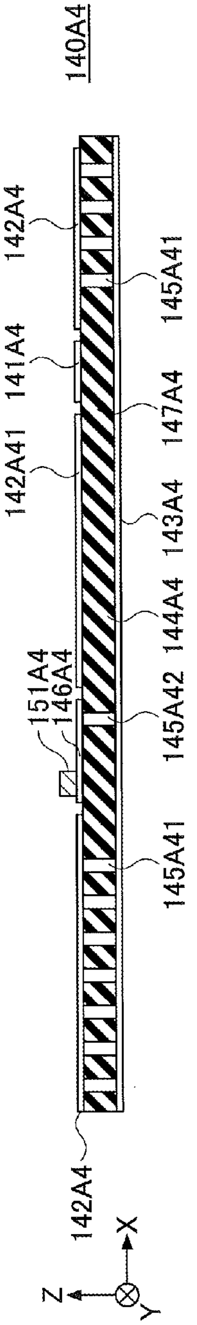

As illustrated in FIGS. 10A and 10B, the substrate 140A4 includes a resonator 141A4, a wiring layer 142A4, a wiring layer 143A4, an insulating layer 144A4, vias 145A41, vias 145A42, and a pad 146A4. FIGS. 11A and 11B illustrate the substrate 140A4 in a state where the circuit device 150A illustrated in FIGS. 10A and 10B is removed.

The resonator 141A4 includes a pair of slots formed in the wiring layer 142A4. The pair of slots of the resonator 141A4 extends in the Y-axis direction, and the two slots are spaced apart from each other in the X-axis direction.

The length of the pair of slots of the resonator 141A4 in the Y-axis direction is to be set to an appropriate width according to the radiation properties, and accordingly, the interval between the two slots is preferably set to half (λ/2) the length of the wavelength λ in the communication frequency. Furthermore, the width of each of the two slots of the resonator 141A4 is to be set to an appropriate width according to the radiation properties of the resonator 141A4; preferably less than the thickness of the insulating layer 144A.

For example, the resonator 141A4 is formed together with the wiring layer 142A4 and the pad 146A4, by patterning copper foil formed on the surface of the insulating layer 144A4 on the Z-axis positive direction side.

The wiring layer 142A4 is maintained at ground potential. The wiring layer 142A4 is formed on a part of the surface of the insulating layer 144A4 on the Z-axis positive direction side, excluding the parts of the pair of slots of the resonator 141A4 and the pad 146A4.

Furthermore, the wiring layer 142A4 is connected to the wiring layer 143A4 via the vias 145A41. The wiring layer 142A4 and the wiring layer 143A4 are maintained at ground potential.

The wiring layer 142A4 is formed together with the resonator 141A4 and the pad 146A4, by patterning copper foil formed on the surface of the insulating layer 144A4 on the Z-axis positive direction side.

The wiring layer 143A4 is formed on the entire surface of the insulating layer 144A4 on the Z-axis negative direction side. The wiring layer 143A4 is connected to the wiring layer 142A4 via the vias 145A41, and is maintained at ground potential.

Furthermore, the wiring layer 143A4 is connected to the pad 146A4 by the vias 145A42.

The insulating layer 144A4 is an insulating layer formed by, for example, impregnating glass fiber with an epoxy resin, when the substrate 140A4 is a printed circuit board conforming to the FR-4 specification. Here, a wiring layer in the inner layer of the insulating layer 144A4 is not illustrated; however, a wiring layer that is an inner layer may be formed in the insulating layer 144A4.

The vias 145A41 connect the wiring layer 142A4 and the wiring layer 143A4. Multiple vias 145A41 are formed, such that the wiring layer 142A4 and the wiring layer 143A4 are connected across the entire surfaces in a plan view.

However, the vias 145A41 are not formed between the resonator 141A4 and the pad 146A4. Here, the part of the wiring layer 142A4, which is positioned between the resonator 141A4 and the pad 146A4 in a plan view, and which is a part where the vias 145A41 are not connected, is referred to as a waveguide part 142A41. The waveguide part 142A41 and the corresponding part of the wiring layer 143A4 constitute a waveguide tube 147A4.

The vias 145A41 are formed in a part of the wiring layer 142A4 that corresponds to a part obtained by removing, from the entire surface of the wiring layer 142A4 in a plan view, the waveguide part 142A41 and an area indicated by dashed lines on the Y-axis positive direction side and on the Y-axis negative direction side of the circuit device 150A. The "~" symbols on the Y-axis positive direction side and on the Y-axis negative direction side of the vias 145A41 in FIGS. 10A and 11A indicate that the vias 145A41 are formed up to the edge parts of the wiring layer 142A4 in the Y-axis positive direction side and on the Y-axis negative direction side.

In the area areas indicated by dashed lines on the Y-axis positive direction side and on the Y-axis negative direction side of the circuit device 150A, terminals, etc., of the circuit device 150A are formed, and therefore the vias 145A41 are not formed.

The pitch of the multiple vias 145A41 is set, for example, such that the interval between vias 145A41 adjacent to each other is less than half the wavelength λ in the communication frequency of wireless communication, more preferably less than or equal to λ/4.

The pitch is set as described above for the purpose of trapping the electromagnetic waves transmitted between the circuit device 150A and the resonator 141A4 via the waveguide tube 147A4, in the waveguide tube 147A4. That is to say, the pitch is set to prevent the electromagnetic waves from leaking out of the waveguide tube 147A4.

The vias 145A42 connect the pad 146A4 and the wiring layer 143A4.

The pad 146A4 is formed at a position matching the position of the terminal of the circuit device 150A, and the end of the pad 146A4 on the X-axis negative direction side is connected to the terminal of the circuit device 150A by a bump 151A4. Furthermore, the end of the pad 146A4 on the X-axis positive direction side is connected to the wiring layer 143A4 by the vias 145A42.

The pad 146A4 is a rectangular pad that is long in the X-axis direction and short in the Y-axis direction in a plan view. The four sides of the pad 146A4 are surrounded by the wiring layer 142A4, and for example, the pad 146A4 is formed together with the resonator 141A4 and the wiring layer 142A4 by patterning copper foil formed on the surface of the insulating layer 144A4 on the Z-axis positive direction side.

The vias 145A42 and the pad 146A4 function as a resonator, and radiate signals transmitted from the circuit device 150A in the waveguide tube 147A4.

The waveguide tube 147A4 is positioned between the resonator 141A4 and the pad 146A4 in a plan view on the wiring layer 142A4, and the waveguide tube 147A4 is a transmission path that is constituted by the waveguide part 142A41 where the vias 145A41 are not connected and a part of the wiring layer 143A4 corresponding to the waveguide part 142A41.

The waveguide tube 147A4 is an example of a first transmission path. Furthermore, a waveguide tube that is similarly formed on the substrate 140B (FIG. 1) is an example of a second transmission path.

The waveguide tube 147A4 is able to transmit electromagnetic waves in a bidirectional manner between the vias 145A42 connected to the pad 146A4 and the resonator 141A4.

Therefore, the signals output from the circuit device 150A via the bump 151A1 are transmitted through the pad 146A4 and the vias 145A42, and by the waveguide tube 147A4.

Furthermore, the signals input to the resonator 141A4 are transmitted through the waveguide tube 147A4 to the vias 145A42, and transmitted through the pad 146A4 and the bump 151A4 to the circuit device 150A.

As described above, the substrate 140A and the substrate 140B of the wireless communication device 100 according to the first embodiment are capable of transmitting signals between the circuit device 150A and the resonator 141A, and between the circuit device 150B and the resonator 141B, respectively, by the transmission paths included in the substrates 140A1 through 140A4 described with reference to FIGS. 7A through 11B.

Furthermore, by transmitting signals between the resonator 123A1 and the resonator 141A of the resonance device 120A described with reference to FIGS. 3 through 4E, it is possible to transmit signals between the resonator 121A1 and the circuit device 150A.

Similarly, by transmitting signals between the resonator 123B1 and the resonator 141B of the resonance device 120B, it is possible to transmit signals between the resonator 121B1 and the circuit device 150B.

Therefore, in a state where the wireless communication device 100A and the wireless communication device 100B are closely-situated as illustrated in FIG. 1, by performing wireless communication between the resonator 121A1 of the resonance device 120A and the resonator 121B1 of the resonance device 120B, it is possible to transmit and receive signals between the circuit device 150A and the circuit device 150B.

Here, the distance between the resonator 121A1 and the resonator 121B1 is to be set at, for example, a distance that is approximately less than or equal to half (λ/2) or one quarter (λ/4) of the length of the wavelength λ in the communication frequency of wireless communication. This is a distance that is given as a neighborhood solution.

As described above, by making the resonator 121A1 and the resonator 121B1 face each other in a closely-situated manner, it is possible to integrate the resonator 121A1 and the resonator 121B1, so that signals are transmitted efficiently between the resonator 121A1 and the resonator 121B1.

For example, when the wireless communication device 100 according to the first embodiment performs data communication at a transmission speed of 1 Gbps, a communication frequency band of approximately 1 GHz is needed, and it is advantageous to perform communication with the use of a millimeter waveband that is sufficiently higher than the communication frequency band as the carrier frequency. When the wireless communication device 100 according to the first embodiment performs data communication at a transmission speed of greater than or equal to 1 Gbps by using a millimeter waveband, the distance between the resonator 121A1 and the resonator 121B1 is to be set at, for example, approximately several millimeters through several tens of millimeters.

Furthermore, the resonator 121A1 is positioned outside of the housing 110A, more than the wall part 110A1, and the resonator 121B1 is positioned outside of the housing 110B, more than the wall part 110B1.

Therefore, the electromagnetic waves (signals) radiated from the resonator 121A1 reach the resonator 121B1 without being blocked by surrounding structural objects, etc. Similarly, the electromagnetic waves (signals) radiated from the resonator 121B1 reach the resonator 121A1 without being blocked by surrounding structural objects, etc.

Therefore, by the wireless communication device 100 according to the first embodiment, it is possible to efficiently transmit electromagnetic waves (signals) between the wireless communication device 100A including the resonator 121A1 and the wireless communication device 100B including the resonator 121B1.

As described above, according to the first embodiment, the wireless communication device 100 having high transmission efficiency is provided. Furthermore, according to the first embodiment, the wireless communication device 100A and the wireless communication device 100B having high transmission efficiency are provided.

Furthermore, according to the first embodiment, the electronic device 500 including the wireless communication device 100 (100A, 100B) having high transmission efficiency is provided.

Figure 12:
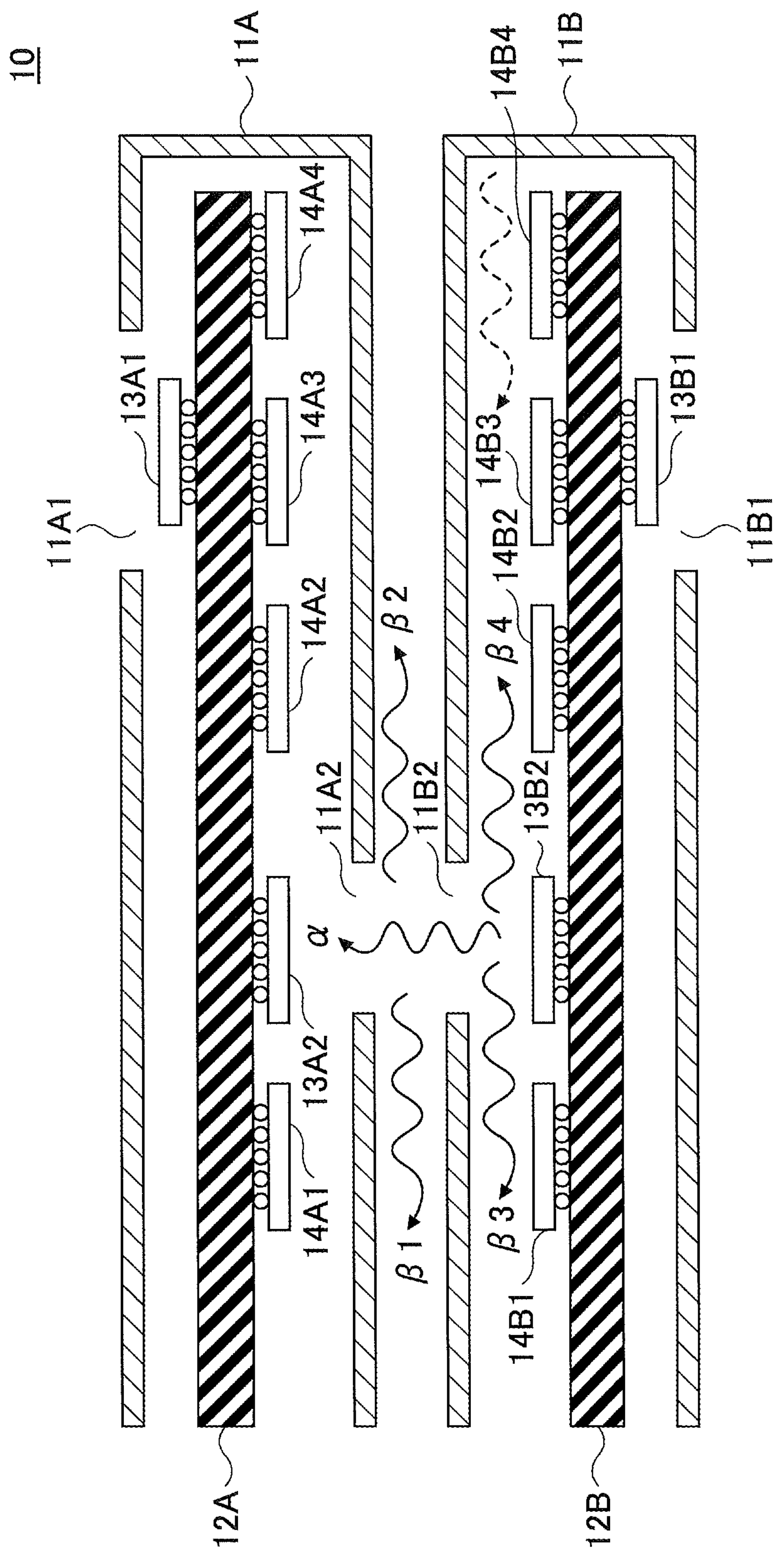
FIG. 12 illustrates a cross-sectional structure of a wireless communication device 10 according to a comparative example.

Here, with reference to FIG. 12, a description is given of a wireless communication device 10 according to a comparative example.

FIG. 12 illustrates a cross-sectional structure of the wireless communication device 10 according to the comparative example.

The wireless communication device 10 according to the comparative example includes a housing 11A, a housing 11B, a substrate 12A, a substrate 12B, antenna modules 13A1, 13A2, 13B1, and 13B2, modules 14A1 through 14A4, and modules 14B1 through 14B4.

The wireless communication device 10 according to the comparative example does not perform wireless communication between the housing 110A and the housing 110B by the resonator 121A1 and the resonator 121B1 as in the wireless communication device 100 according to the first embodiment; instead, the wireless communication device 10 according to the comparative example performs wireless communication between the housing 11A and the housing 11B by using the antenna modules 13A1, 13A2, 13B1, and 13B2.

The housing 11A and the housing 11B are, for example, housings made of metal, and include opening parts 11A1, 11A2 and opening parts 11B1, 11B2, respectively. The housing 11A and the housing 11B are closely-situated and parallel to each other. Inside the housing 11A and the housing 11B, the substrate 12A and the substrate 12B are arranged, respectively.

For example, the substrate 12A and the substrate 12B are printed circuit boards (PCB) conforming to the FR-4 (Flame Retardant Type 4) specification, and include a plurality of wiring layers arranged on the front side, the inner layer, and the back side.

The antenna module 13A1 and the antenna module 13A2 include at least an antenna, and are mounted on the substrate 12A. The antenna module 13A1 and the antenna module 13A2 radiate or receive electromagnetic waves. Similarly, the antenna module 13B1 and the antenna module 13B2 include at least an antenna, and are mounted on the substrate 12B. The antenna module 13B1 and the antenna module 13B2 radiate or receive electromagnetic waves. For example, the antenna modules 13A1, 13A2, 13B1, and 13B2 are patch antennas, and radiate electromagnetic waves radially from a radiation plane. In the following, the antenna modules 13A1, 13A2, 13B1, and 13B2 are referred to as antennas.

For example, the modules 14A1 through 14A4 and the modules 14B1 through 14B4 are circuit devices, etc., for generating signals, etc., for communication. The modules 14A1 through 14A4 and the modules 14B1 through 14B4 transmit signals between the antennas 13A1, 13A2, 13B1, and 13B2 via the substrate 12A and the substrate 12B, respectively.

For example, as illustrated in FIG. 12, in a state where the housing 11A and the housing 11B are closely-situated, and the opening part 11A2 and the opening part 11B2 are facing each other, the antenna 13A2 and the antenna 13B2 are able to transmit and receive electromagnetic waves via the opening part 11A2 and the opening part 11B2, respectively.

That is to say, the wireless communication device 10 is able to perform wireless communication between the antenna 13A2 and the antenna 13B2.

However, the antenna 13A2 is offset to the inside of the housing 11A more than the opening part 11A2 of the housing 11A, and similarly, the antenna 13B2 is offset to the inside of the housing 11B more than the opening part 11B2 of the housing 11B. Furthermore, the distance between the antenna 13A2 and the antenna 13B2 is not a short distance that is given as a neighborhood solution, but the distance is longer, for example, approximately ten times longer than the wavelength.

Therefore, when electromagnetic waves are radiated from the antenna 13B2 to the antenna 13A2 of the wireless communication device 10 illustrated in FIG. 12, some electromagnetic waves proceed toward the antenna 13A2 as indicated by an arrow α, while other electromagnetic waves do not reach the antenna 13A2 as indicated by arrows β1 through β4. This is because the electromagnetic waves are radiated radially from the antenna 13B2.

The electromagnetic waves indicated by the arrows β1 and β2 are radiated from the antenna 13B2, through the opening part 11B2, and outside the housing 11B; these electromagnetic waves are propagated in the horizontal direction between the housing 11A and the housing 11B without passing through the opening part 11A2 of the housing 11A.

Furthermore, the electromagnetic waves indicated by the arrows β3 and β4 are radiated from the antenna 13B2 and are propagated inside the housing 11B without passing through the opening part 11B2. At this time, as indicated by the dashed-line arrow, reflected waves of the electromagnetic waves indicated by the arrow β4 are also generated. There is a delay in these reflected waves, and therefore these reflected waves have an adverse effect on the direct waves α.

The electromagnetic waves indicated by the arrows β1 through β4 are not transmitted from the antenna 13B2 to the antenna 13A2, and therefore the transmission efficiency of the wireless communication device 10 illustrated in FIG. 12 is not as high as that of the wireless communication device 100 (see FIG. 1) according to the first embodiment.

This is because in a configuration in which the antenna 13A2 and the antenna 13B2 are facing each other and spaced apart, the electromagnetic waves radiated by the antenna 13B2 spread out in a radial manner, and only a small amount of the electromagnetic waves, which are radiated from the antenna 13B2, reach the antenna 13A2 of the communication counterpart.

Note that the same applies to the case where electromagnetic waves are transmitted from the antenna 13A2 to the antenna 13B2.

Figure 13:
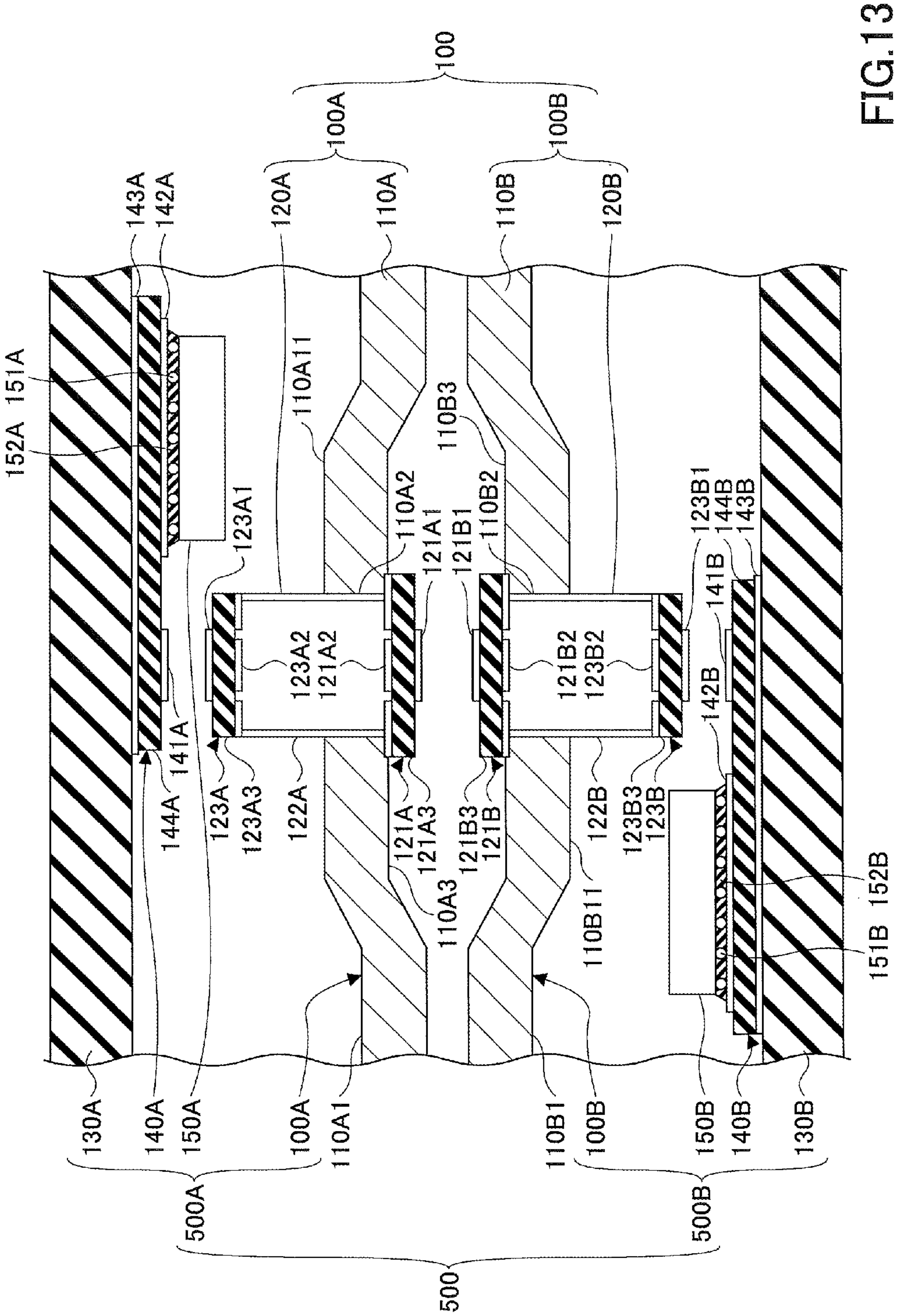
FIG. 13 illustrates the wireless communication device 100 according to a modification example of the first embodiment.

FIG. 13 illustrates the wireless communication device 100 according to a modification example of the first embodiment. In the wireless communication device 100 illustrated in FIG. 13, a recessed part 110A3 and a recessed part 110B3 are formed in the wall part 110A1 of the housing 110A and the wall part 110B1 of the housing 110B, respectively. The recessed part 110A3 is an example of a first recessed part, and the recessed part 110B3 is an example of a second recessed part.

The recessed part 110A3 and the recessed part 110B3 are parts of the wall part 110A1 and the wall part 110B1 that are recessed inward into the housing 110A and the housing 110B, respectively. An opening part 110A2 and an opening part 110B2 are formed in the recessed part 110A3 and the recessed part 110B3, respectively.

Therefore, even in a case where the distance between the wall part 110A1 of the housing 110A and the wall part 110B1 of the housing 110B is significantly short, as illustrated in FIG. 13, it is possible to prevent the resonator 121A1 and the resonator 121B1 from contacting each other.

Furthermore, when the distance between the wall part 110A1 of the housing 110A and the wall part 110B1 of the housing 110B is significantly short, and therefore it is not possible to secure a distance needed for performing wireless communication between the resonator 121A1 and the resonator 121B1, by providing the recessed part 110A3 and the recessed part 110B3, it is possible to secure a longer distance between the resonator 121A1 and the resonator 121B1.

Note that the respective offset amounts of the recessed part 110A3 and the recessed part 110B3 with respect to the wall part 110A1 and the wall part 110B1 (the respective sizes of difference in level between the surfaces of the wall part 110A1 and the wall part 110B1 and the surfaces of the recessed part 110A3 and the recessed part 110B3), are to be set to an appropriate length, such that contact between the resonator 121A1 and the resonator 121B1 is avoided, or such that a distance between the resonator 121A1 and the resonator 121B1 is secured.

Second Embodiment

Figure 14:
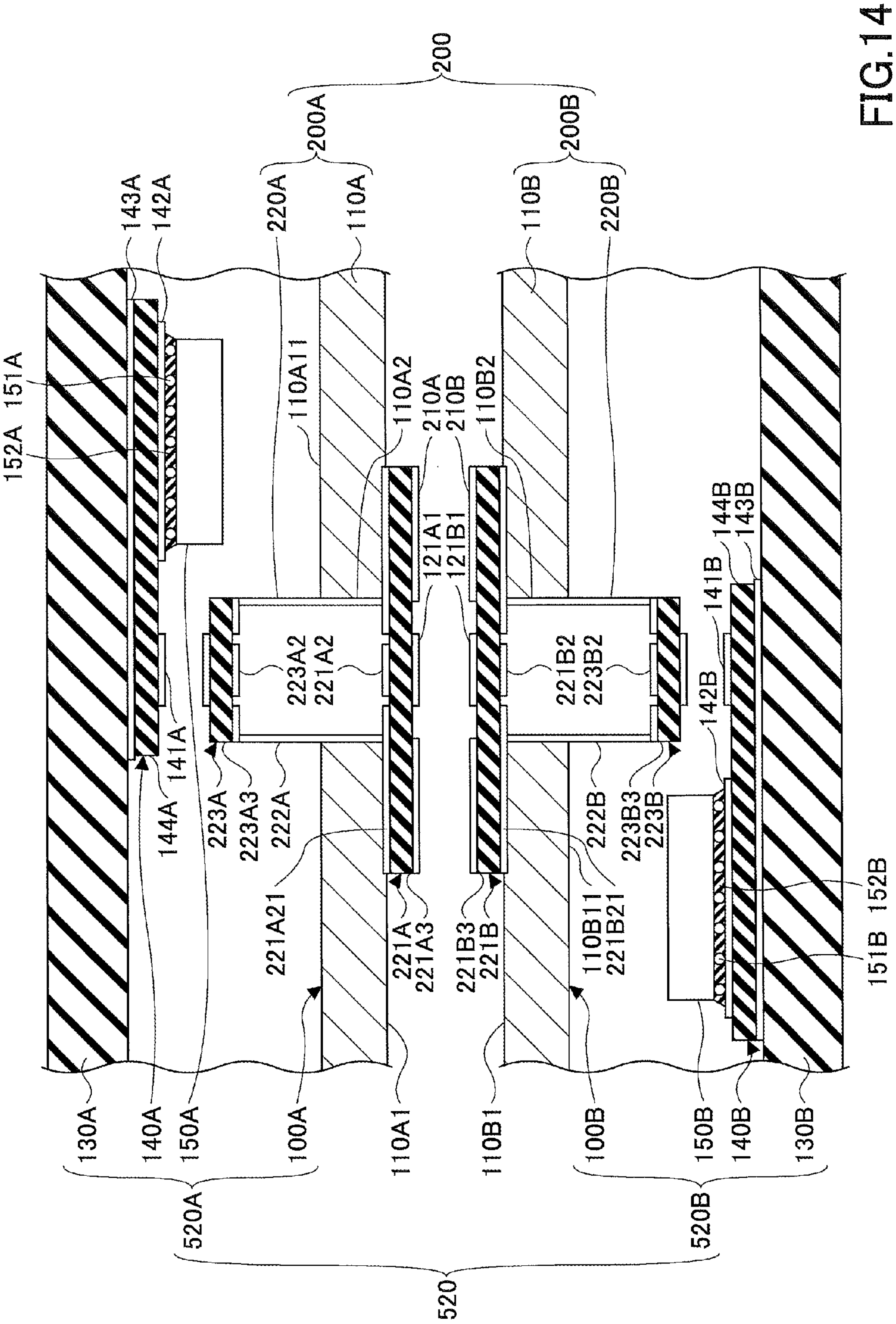
FIG. 14 is a cross-sectional view of a wireless communication device 200 and an electronic device 520 according to a second embodiment.

FIG. 14 is a cross-sectional view of a wireless communication device 200 and an electronic device 520 according to a second embodiment.

In the wireless communication device 200 according to the second embodiment, the resonance device 120A and the resonance device 120B of the wireless communication device 100 according to the first embodiment are replaced with a resonance device 220A and a resonance device 220B. The resonance device 220A and the resonance device 220B have a configuration in which an attenuation unit 210A and an attenuation unit 210B are respectively added to the resonance device 120A and the resonance device 120B of the wireless communication device 100 according to the first embodiment.

Furthermore, in the electronic device 520 according to the second embodiment, the wireless communication device 100 included in the electronic device 500 according to the first embodiment is replaced with the wireless communication device 200 according to the second embodiment. In the second embodiment, the wireless communication device 200 includes a wireless communication device 200A and a wireless communication device 200B, and the electronic device 520 includes an electronic device 520A and an electronic device 520B.

The configurations other than the above are the same as those of the wireless communication device 100 and the electronic device 500 according to the first embodiment, and therefore the same constituent elements are denoted by the same reference numerals, and descriptions thereof are omitted. Furthermore, the following description is also made with reference to FIG. 15 in addition to FIG. 14.

Figure 15:
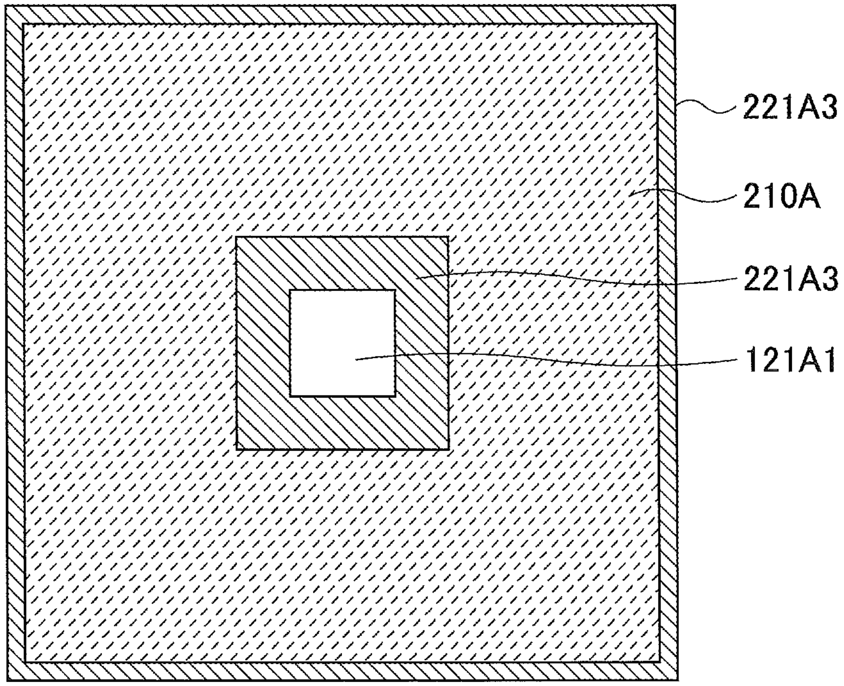
FIG. 15 is a plan view of the resonance substrate 121A and an attenuation unit 210A of a resonance device 220A of a wireless communication device 200A according to the second embodiment.

FIG. 15 is a plan view of the resonance substrate 121A and the attenuation unit 210A of the resonance device 220A of the wireless communication device 200A according to the second embodiment.

As illustrated in FIG. 14, the resonance device 220A includes the attenuation unit 210A, a resonance substrate 221A, the waveguide tube 122A, and the resonance substrate 123A. The resonance device 220B includes the attenuation unit 210B, a resonance substrate 221B, the waveguide tube 122B, and the resonance substrate 123B.

The resonance substrate 221A includes the resonator 121A1, a resonator 221A2, and an insulating layer 221A3. The insulating layer 221A3 is larger than the insulating layer 121A3 according to the first embodiment in a plan view. Similarly, in the resonator 221A2, a ground element 221A21 connected to the waveguide tube 122A is larger than the ground element of the resonator 121A2 according to the first embodiment.

In a plan view, the attenuation unit 210A is formed around the resonator 121A1 of the insulating layer 221A3. Here, the attenuation unit 210A may be handled as a constituent element of the resonance substrate 221A.

The resonance substrate 221B includes the resonator 121B1, a resonator 221B2, and an insulating layer 221B3. The insulating layer 221B3 is larger than the insulating layer 121B3 according to the first embedment in a plan view. Similarly, in the resonator 221B2, a ground element 221B21 connected to the waveguide tube 122B is larger than the ground element of the resonator 121B2 according to the first embodiment.

In a plan view, the attenuation unit 210B is formed around the resonator 121B1 of the insulating layer 221B3. Here, the attenuation unit 210B may be handled as a constituent element of the resonance substrate 221B.

As illustrated in FIG. 15, the attenuation unit 210A is a rectangular ring member having a concentric rectangular shape around the resonator 121A1 on one side (bottom side as viewed in FIG. 14) of the insulating layer 221A3.

The attenuation unit 210A is a member for attenuating electromagnetic waves, and is formed to surround the four sides of the resonator 121A1. For example, the attenuation unit 210A is a member having an electric resistance. The attenuation unit 210A is an example of a first attenuation unit.

The attenuation unit 210A is provided for attenuating or dissipating the components of the electromagnetic waves that are propagated in a planar manner from the resonator 121A1 without reaching the resonator 121B1 facing the resonator 121A1, among the electromagnetic waves that are radiated in a radial manner from the resonator 121A1. That is to say, the attenuation unit 210A converts the electromagnetic waves propagating in the horizontal direction (planar direction) from the resonator 121A1 into heat energy, etc., by a resistance, to attenuate or dissipate such electromagnetic waves. Note that the attenuation unit 210A does not have to completely dissipate the electromagnetic waves propagating in the horizontal direction (planar direction) from the resonator 121A1, as long as the attenuation unit 210A attenuates such electromagnetic waves to a power level such that no adverse effects are inflicted on the surroundings.

Figure 16:
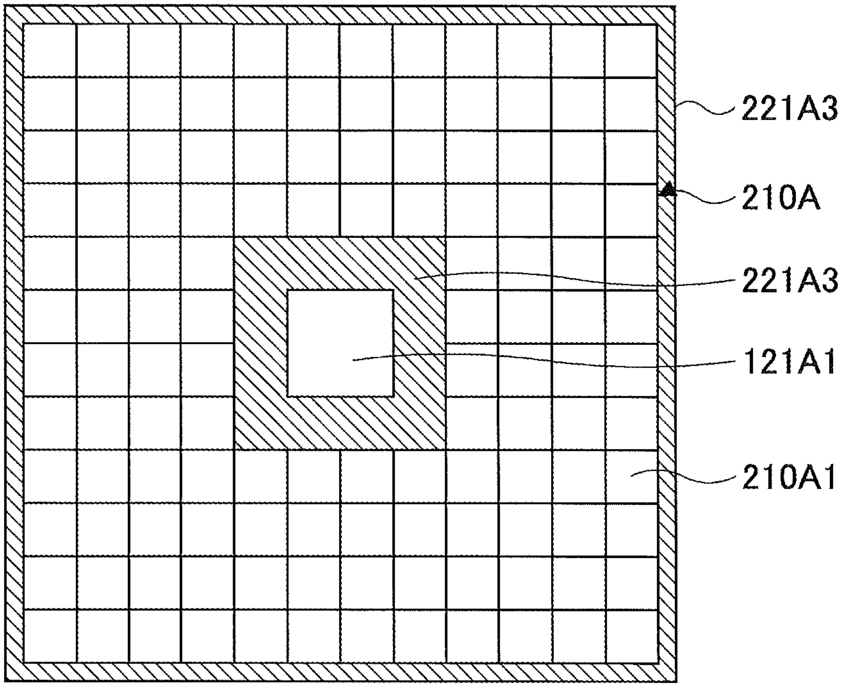
FIG. 16 is a plan view of a configuration example of the attenuation unit 210A of the wireless communication device 200A according to the second embodiment.

FIG. 16 is a plan view of a configuration example of the attenuation unit 210A of the wireless communication device 200A according to the second embodiment.

As illustrated in FIG. 16, for example, the attenuation unit 210A corresponds to a plurality of metal resonance pattern units 210A1 formed inside a rectangular ring area around the resonator 121A1 on one side (bottom side as viewed in FIG. 14) of the insulating layer 221A3.

The metal resonance pattern units 210A1 are formed as concentric rectangles around the resonator 121A1 on one side (bottom side as viewed in FIG. 14) of the insulating layer 221A3. The respective distances between the center points of the metal resonance pattern units 210A1 are all the same, and the metal resonance pattern units 210A1 are arranged in a cyclic manner. Resonance patterns on which metal layers are formed, are arranged on the metal resonance pattern units 210A1.

FIG. 16 illustrates 128 metal resonance pattern units 210A1. The 128 metal resonance pattern units 210A1 are cyclically patterned with respect to each other in a lattice, as illustrated in FIG. 16. The resonators of the metal resonance pattern units 210A1 are cyclically arranged to achieve a function of attenuating and absorbing the electromagnetic waves in the desired frequency band, i.e., a wireless carrier frequency band. The above-described structure in which metal patterns are cyclically arranged to suppress the transmission of a particular frequency, is also referred to as an EBG (Electromagnetic Band-Gap) structure.

The above-described metal resonance pattern units 210A1 may be formed by, for example, performing a laser process on the metal layers shaped as rectangular rings formed as concentric rectangles around the resonator 121A1 on one side (bottom side as viewed in FIG. 14) of the insulating layer 221A3, to divide the metal layers into a lattice. The metal resonance pattern units 210A1 are realized by, for example, copper foil or aluminum foil.

When the metal resonance pattern units 210A1 are made of copper foil, for example, the metal resonance pattern units 210A1 may be formed by patterning the copper foil formed as concentric rectangles around the resonator 121A1 on one side (bottom side as viewed in FIG. 14) of the insulating layer 221A3, by performing an etching process or a laser process. This copper foil may be the same as the copper foil used for forming the resonator 121A1.

Furthermore, when the metal resonance pattern units 210A1 are made of aluminum foil, for example, the metal resonance pattern units 210A1 may be formed by forming aluminum foil in areas that are concentric rectangles around the resonator 121A1 on one side (bottom side as viewed in FIG. 14) of the insulating layer 221A3 by vapor deposition, etc., and then patterning the aluminum foil by performing a laser process, etc.

Note that a description is given of the attenuation unit 210A formed in the resonance device 220A with reference to FIGS. 15 and 16; however, the same applies to the attenuation unit 210B formed in the resonance device 220B. The attenuation unit 210B is an example of a second attenuation unit.

Therefore, similar to the wireless communication device 100 according to the first embodiment, by the wireless communication device 200 according to the second embodiment, it is possible to efficiently transmit electromagnetic waves (signals) between the wireless communication device 200A including the resonator 121A1 and the wireless communication device 200B including the resonator 121B1.

As described above, according to the second embodiment, the wireless communication device 200 having high transmission efficiency is provided. Furthermore, according to the second embodiment, the wireless communication device 200A and the wireless communication device 200B having high transmission efficiency are provided.

Furthermore, according to the second embodiment, the electronic device 520 including the wireless communication device 200 (200A, 200B) having high transmission efficiency is provided.

Furthermore, by the wireless communication device 200 according to the second embodiment, when electromagnetic waves are propagated between the housing 110A and the housing 110B, from between the resonator 121A1 and the resonator 121B1, it is possible to attenuate the electromagnetic waves by the attenuation unit 210A and the attenuation unit 210B.

Therefore, according to the second embodiment, the wireless communication device 200 having high transmission efficiency and further improved communication performance is provided.

Furthermore, for example, when the interval between the wall part 110A1 of the housing 110A and the wall part 110B1 of the housing 110B is a length that is approximately an integral multiple of the wavelength λ in the communication frequency of wireless communication, it is possible to suppress a situation where resonance occurs between the wall part 110A1 and the wall part 110B1.

Therefore, according to the second embodiment, the wireless communication device 200 is provided, in which the communication performance is further improved by suppressing the occurrence of resonance between the wall part 110A1 and the wall part 110B1.

Third Embodiment

Figure 17:
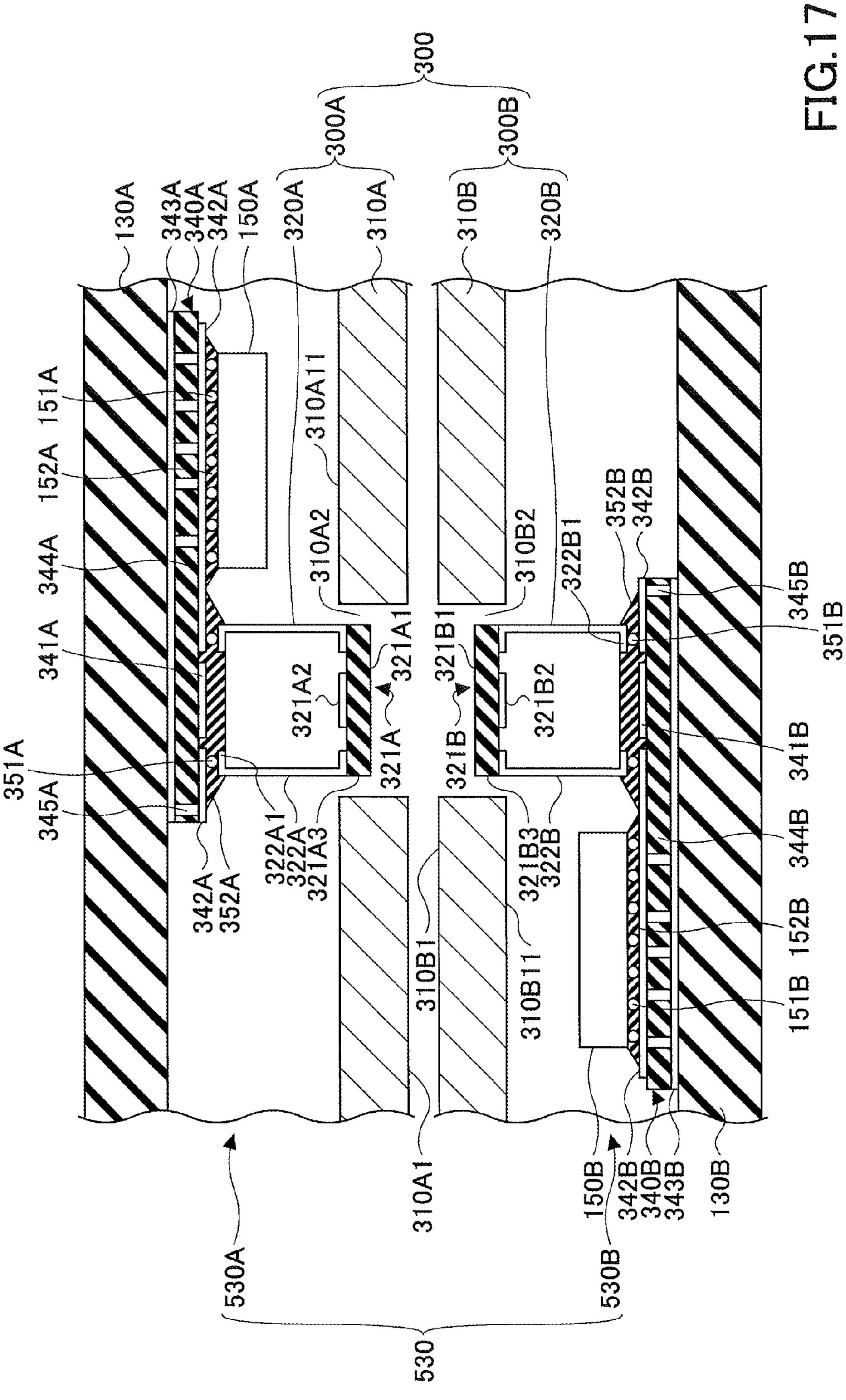
FIG. 17 is a cross-sectional view of a wireless communication device 300 and an electronic device 530 according to a third embodiment.

FIG. 17 is a cross-sectional view of a wireless communication device 300 and an electronic device 530 according to a third embodiment.

In the wireless communication device 300 according to the third embodiment, the resonance device 120A, the resonance device 120B, the substrate 140A, and the substrate 140B of the wireless communication device 100 according to the first embodiment, are replaced by a resonance device 320A, a resonance device 320B, a substrate 340A, and a substrate 340B. The resonance device 320A and the resonance device 320B are respectively mounted on the substrate 340A and the substrate 340B, which is different from the resonance device 120A and the resonance device 120B of the first embodiment.

Furthermore, in the electronic device 530 according to the third embodiment, the wireless communication device 100 included in the electronic device 500 according to the first embodiment is replaced with the wireless communication device 300 according to the third embodiment.

The configurations other than the above are the same as those of the wireless communication device 100 and the electronic device 500 according to the first embodiment, and therefore the same constituent elements are denoted by the same reference numerals, and descriptions thereof are omitted.

The wireless communication device 300 according to the third embodiment includes a wireless communication device 300A and a wireless communication device 300B. The wireless communication device 300A includes a housing 310A and a resonance device 320A. The wireless communication device 300B includes a housing 310B and a resonance device 320B.

The electronic device 530 according to the third embodiment includes an electronic device 530A and an electronic device 530B. The electronic device 530A includes the wireless communication device 300A, the substrate 130A, the substrate 340A, and the circuit device 150A. Similarly, the electronic device 530B includes the wireless communication device 300B, the substrate 130B, the substrate 340B, and the circuit device 150B.

Note that here, the substrate 130A and the substrate 340A are handled as constituent elements of the electronic device 530A; however, the substrate 130A and the substrate 340A may be handled as constituent elements of the wireless communication device 300A. That is to say, the wireless communication device 300A may be handled as including the housing 310A, the resonance device 320A, the substrate 130A, and the substrate 340A.

Similarly, here, the substrate 130B and the substrate 340B are handled as constituent elements of the electronic device 530B; however, the substrate 130B and the substrate 340B may be handled as constituent elements of the wireless communication device 300B. That is to say, the wireless communication device 300B may be handled as including the housing 310B, the resonance device 320B, the substrate 130B, and the substrate 340B.

The housing 310A and the housing 310B are, for example, housings made of metal, and include a wall part 310A1 and a wall part 310B1, respectively. The housing 310A and the housing 310B are juxtaposed in a state where the wall part 310A1 and the wall part 310B1 are closely-situated and substantially parallel to each other. The housing 310A is an example of a first housing, and the housing 310B is an example of a second housing. The wall part 310A1 is an example of a first wall part, and the wall part 310B1 is an example of a second wall part.

The housing 310A and the housing 310B include an opening part 310A2 and an opening part 310B2 that are formed in the wall part 310A1 and the wall part 310B1, respectively. The opening part 310A2 is an example of a first opening part and the opening part 310B2 is an example of a second opening part.

The opening part 310A2 and the opening part 310B2 are rectangular opening parts in a plan view. From the opening part 310A2, a resonator 321A2 of the resonance device 320A is facing outside the housing 310A via an insulating layer 321A3. Furthermore, from the opening part 310B2, a resonator 321B2 of the resonance device 320B is facing outside the housing 310B via an insulating layer 321B3.

The sizes of the openings of the opening part 310A2 and the opening part 310B2 are preferably greater than or equal to the sizes of a resonance substrate 321A and a resonance substrate 321B of the resonance device 320A and the resonance device 320B, respectively. Note that the sizes of the openings of the opening part 310A2 and the opening part 310B2 in a plan view are to be appropriately set so as not to hamper the radiation of electromagnetic waves of the resonance substrate 321A and the resonance substrate 321B, respectively.

Note that FIG. 17 only illustrates the part of the wall part 310A1 where the opening part 310A2 is formed among the wall part of the housing 310A; however, the housing 310A is formed so as to surround (incorporate) the resonance device 320A, the substrate 130A, the substrate 340A, and the circuit device 150A. Similarly, FIG. 17 only illustrates the part of the wall part 310B1 where the opening part 310B2 is formed among the wall part of the housing 310B; however, the housing 310B is formed so as to surround (incorporate) the resonance device 320B, the substrate 130B, the substrate 340B, and the circuit device 150B.

The resonance device 320A and the resonance device 320B are mounted on the substrate 340A and the substrate 340B, respectively. The resonance device 320A includes the resonance substrate 321A and a waveguide tube 322A. Similarly, the resonance device 320B includes the resonance substrate 321B and a waveguide tube 322B. The resonance device 320A is an example of a first resonance device, and the resonance device 320B is an example of a second resonance device. The waveguide tube 322A is an example of a first waveguide tube, and the waveguide tube 322B is an example of a second waveguide tube.

The resonance device 320A is mounted on the substrate 140A, such that the resonator 321A2 of the resonance substrate 321A faces outside of the housing 310A from the opening part 310A2. The waveguide tube 322A of the resonance device 320A has a rectangular cross-sectional shape, or may have a cross-sectional shape corresponding to any of FIGS. 2A through 2E according to the first embodiment. The resonator 321A2 is an example of a first resonator.

Similarly, the resonance device 320B is mounted on the substrate 140B, such that the resonator 321B2 of the resonance substrate 321B faces outside of the housing 310B from the opening part 310B2. The waveguide tube 322B of the resonance device 320B has a rectangular cross-sectional shape, or may have a cross-sectional shape corresponding to any of FIGS. 2A through 2E according to the first embodiment. The resonator 321B2 is an example of a second resonator.

The resonance substrate 321A includes a first plane 321A1, the resonator 321A2, and the insulating layer 321A3. The first plane 321A1 is the side of the insulating layer 321A3 opposite to the side that is connected to the waveguide tube 322A, and the resonator 321A2 is formed on the side connected to the waveguide tube 322A of the insulating layer 321A3.

For example, similar to the first plane of FIG. 4B, the entire surface of the first plane 321A1 is occupied by the insulating layer 321A3, and there is no resonator on the first plane 321A1.

For example, the resonator 321A2 is formed by patterning copper foil adhered to the front side and the back side of the insulating layer 321A3. The resonance substrate 321A transmits electromagnetic waves by the resonator 321A2.

The radiation plane of the resonator 321A2 is positioned outside of the housing 310A, more than a plane of the wall part 310A1 positioned inside the housing 310A, inside the opening part 310A2. That is to say, the resonator 321A2 is arranged such that the radiation plane is at a position on the outside of the housing 310A, more than the inner wall of the housing 310A.

This position is set such that the electromagnetic waves radiated from the resonator 321A2 are not propagated inside the housing 310A but propagated outside the housing 310A.

Similarly, the resonance substrate 321B includes a first plane 321B1, the resonator 321B2, and the insulating layer 321B3. The first plane 321B1 is the side of the insulating layer 321B3 opposite to the side that is connected to the waveguide tube 322B, and the resonator 321B2 is formed on the side connected to the waveguide tube 322B of the insulating layer 321B3.

For example, similar to the first plane of FIG. 4B, the entire surface of the first plane 321B1 is occupied by the insulating layer 321B3, and there is no resonator on the first plane 321B1.

For example, the resonator 321B2 is formed by patterning copper foil adhered to the front side and the back side of the insulating layer 321B3. The resonance substrate 321B transmits electromagnetic waves by the resonator 321B2.

The radiation plane of the resonator 321B2 is positioned outside of the housing 310B, more than a plane of the wall part 310B1 positioned inside the housing 310B, inside the opening part 310B2. That is to say, the resonator 321B2 is arranged such that the radiation plane is at a position on the outside of the housing 310B, more than the inner wall of the housing 310B.

This position is set such that the electromagnetic waves radiated from the resonator 321B2 are not propagated inside the housing 310B but propagated outside the housing 310B.

For example, the waveguide tube 322A and the waveguide tube 322B are constituted by a metal film that is molded into a rectangular tube, or into a deformed rectangle as illustrated in FIGS. 2B, 2C, 2D, and 2E according to the first embodiment. As the metal film, for example, copper foil or metal foil made of aluminum may be used. The waveguide tube 322A and the waveguide tube 322B are to have the inner faces covered by a metal layer, and therefore a metal layer may be formed on the inner surfaces of the resin member having a shape of a rectangular tube or a deformed rectangle. Alternatively, the waveguide tube 322A and the waveguide tube 322B may be a hollow waveguide tube only having a metal layer without the inner resin. For example, the metal layer may be made of copper or aluminum. The waveguide tube 322A and the waveguide tube 322B have a configuration in which an end part 322A1 and an end part 322B1 are added to the waveguide tube 122A and the waveguide tube 122B according to the first embodiment, respectively. Each of the end part 322A1 and the end part 322B1 is a metal layer shaped as a rectangular ring, including a rectangular opening part in a plan view.

One end of the waveguide tube 322A (bottom end as viewed in FIG. 17) is connected to the resonator 321A2 of the resonance substrate 321A, and the end part 322A1 of the other end (top end as viewed in FIG. 17) is connected to a wiring layer 342A of the substrate 340A by solder balls 351A. The solder balls 351A may be metal bumps.

A plurality of solder balls 351A are arranged along the cross-section of the rectangular ring shape of the waveguide tube 322A in a plan view. The interval between adjacent solder balls 351A is set to be less than half the wavelength λ in the communication frequency of wireless communication, more preferably less than or equal to λ/4.

This interval is set to prevent the electromagnetic waves from leaking outside from the connection part of the waveguide tube 322A and the transmission path of the substrate 340A.

The waveguide tube 322A forms a waveguide between the resonator 321A2 and a resonator 341A of the substrate 340A.

The cross-section parallel to the resonance substrate 321A of the waveguide tube 322A is a rectangle. The waveguide tube 322A transmits electromagnetic waves between the resonance substrate 321A and the resonator 341A of the substrate 340A.

Similarly, one end of the waveguide tube 322B (top end as viewed in FIG. 17) is connected to the resonator 321B2 of the resonance substrate 321B, and the end part 322B1 of the other end (bottom end as viewed in FIG. 17) is connected to a wiring layer 342B of the substrate 340A by solder balls 351B.

A plurality of solder balls 351B are arranged along the cross-section of the rectangular ring shape of the waveguide tube 322B in a plan view. The interval between adjacent solder balls 351B is set to be less than half the wavelength λ in the communication frequency of wireless communication, more preferably less than or equal to λ/4.

This interval is set to prevent the electromagnetic waves from leaking outside from the connection part of the waveguide tube 322B and the transmission path of the substrate 340B.

The waveguide tube 322B forms a waveguide between the resonator 321B2 and a resonator 341B of the substrate 340B.

The cross-section parallel to the resonance substrate 321B of the waveguide tube 322B is a rectangle. The waveguide tube 322B transmits electromagnetic waves between the resonance substrate 321B and the resonator 341B of the substrate 340B.

The substrate 130A and the substrate 130B are arranged inside the housing 310A and the housing 310B, respectively; and on the substrate 130A and the substrate 130B, the substrate 340A and the substrate 340B are mounted, respectively.

The substrate 340A and the substrate 340B are mounted on the substrate 130A and the substrate 130B inside the housing 310A and the housing 310B, respectively. For example, the substrate 340A and the substrate 340B are printed circuit boards conforming to the FR-4 specification.

The substrate 340A is an example of a first substrate, and the substrate 340B is an example of a second substrate.

The substrate 340A includes the resonator 341A, the wiring layer 342A, a wiring layer 343A, an insulating layer 344A, and vias 345A. The resonator 341A, the wiring layer 342A, and the wiring layer 343A are formed by patterning the copper foil adhered to the front side and the back side of the insulating layer 344A.

The resonator 341A transmits electromagnetic waves between the resonator 341A and the resonator 321A2 of the resonance device 320A. The wiring layer 342A and the wiring layer 343A are maintained at ground potential. On the wiring layer 342A, the circuit device 150A is mounted via the solder balls 151A, and the end part 322A1 of the waveguide tube 322A is connected to the wiring layer 342A via the solder balls 351A. The substrate 340A is connected to the substrate 130A via the wiring layer 343A.

Similarly, the substrate 340B includes the resonator 341B, the wiring layer 342B, a wiring layer 343B, an insulating layer 344B, and vias 345B. The resonator 341B, the wiring layer 342B, and the wiring layer 343B are formed by patterning the copper foil adhered to the front side and the back side of the insulating layer 344B.

The resonator 341B transmits electromagnetic waves between the resonator 341B and the resonator 321B2 of the resonance device 320B. The wiring layer 342B and the wiring layer 343B are maintained at ground potential. On the wiring layer 342B, the circuit device 150B is mounted via the solder balls 151B, and the end part 322B1 of the waveguide tube 322B is connected to the wiring layer 342B via the solder balls 351B. The substrate 340B is connected to the substrate 130B via the wiring layer 343B.

The circuit device 150A and the circuit device 150B are respectively connected to the substrate 340A and the substrate 340B via the solder balls 151A and the solder balls 151B, and fixed by an under-fill material 152A and an under-fill material 152B to be flip-chip mounted on the substrate 340A and the substrate 340B. The circuit device 150A and the circuit device 150B are respectively connected to the resonator 341A and the resonator 341B via transmission paths of the substrate 340A and the substrate 340B. The configuration of the transmission paths of the substrate 150A and the substrate 150B is the same as any of the configurations illustrated in FIGS. 7A through 11B of the first embodiment.

According to the wireless communication device 300 according to the third embodiment as described above, it is possible to transmit and receive signals between the resonator 321A2 of the wireless communication device 300A and the circuit device 150A of the electronic device 530A including the wireless communication device 300A.

Furthermore, it is possible to transmit and receive signals between the resonator 321B1 of the wireless communication device 300B and the circuit device 150B of the electronic device 530B including the wireless communication device 300B.

Therefore, by performing wireless communication between the resonator 321A2 of the resonance device 320A and the resonator 321B2 of the resonance device 320B in a state where the wireless communication device 300A and the wireless communication device 300B are closely-situated, it is possible to transmit and receive electromagnetic waves (signals) between the circuit device 150A and the circuit device 150B.

As described above, according to the third embodiment, the wireless communication device 300 having high transmission efficiency is provided. Furthermore, according to the third embodiment, the wireless communication device 300A and the wireless communication device 300B having high transmission efficiency are provided. Furthermore, according to the third embodiment, the electronic device 530, the electronic device 530A, and the electronic device 530B having high transmission efficiency are provided.

The reason that the transmission efficiency of electromagnetic waves is high in the wireless communication device 300 according to the third embodiment is that the radiation planes of the resonator 321A2 and the resonator 321B2 that perform communication between the wireless communication device 300A and the wireless communication device 300B are positioned outside of the housing 310A and the housing 310B, more than an inner wall 310A11 and an inner wall 310B11 of the wall part 310A1 and the wall part 310B1, respectively.

As the radiation planes of the resonator 321A2 and the resonator 321B2 are positioned on the outside more than an inner wall 310A11 and an inner wall 310B11 of the wall part 310A1 and the wall part 310B1, respectively, there is nothing that blocks the electromagnetic waves between the resonator 321A2 and the resonator 321B2.

Therefore, in the wireless communication device 300 according to the third embodiment, high transmission efficiency of electromagnetic waves is achieved.

Furthermore, in the wireless communication device 300 according to the third embodiment, the resonator 321A2 and the resonator 321B2 are closely-situated such that a neighborhood solution is achieved.

Therefore, even if electromagnetic waves are radiated in a radial manner from the resonator 321A2 and the resonator 321B2, the loss of electromagnetic waves during the transmission is low, and substantially all of the electromagnetic waves are transmitted between the resonator 321A2 and the resonator 321B2.

Note that FIG. 17 illustrates a mode in which the radiation planes of the resonator 321A2 and the resonator 321B2 are respectively positioned outside of the housing 310A and the housing 310B, more than the inner wall 310A11 and the inner wall 310B11 of the housing 310A and the housing 310B, inside the opening part 310A2 and the opening part 310B2.

However, in a case where the electromagnetic waves radiated from the resonator 321A2 and the resonator 321B2 respectively pass through the opening part 310A2 and the opening part 310B2, and are not reflected inside the housing 310A and the housing 310B by the inner wall 310A11 and the inner wall 310B11, the radiation planes of the resonator 321A2 and the resonator 321B2 are respectively positioned inside the housing 310A and the housing 310B, more than the inner wall 310A11 and the inner wall 310B11.

That is to say, when it is possible to define the positional relationship of the resonator 321A2 and the opening part 310A2, such that the electromagnetic waves radiated from the resonator 321A2 are not reflected at the inner wall 310A11 but are radiated outside of the housing 310A from the opening part 310A2, the radiation plane of the resonator 321A2 may be positioned inside the housing 310A more than the inner wall 310A11.

Similarly, when it is possible to define the positional relationship of the resonator 321B2 and the opening part 310B2, such that the electromagnetic waves radiated from the resonator 321B2 are not reflected at the inner wall 310B11 but are radiated outside of the housing 310B from the opening part 310B2, the radiation plane of the resonator 321B2 may be positioned inside the housing 310B more than the inner wall 310B11.

Figure 18:
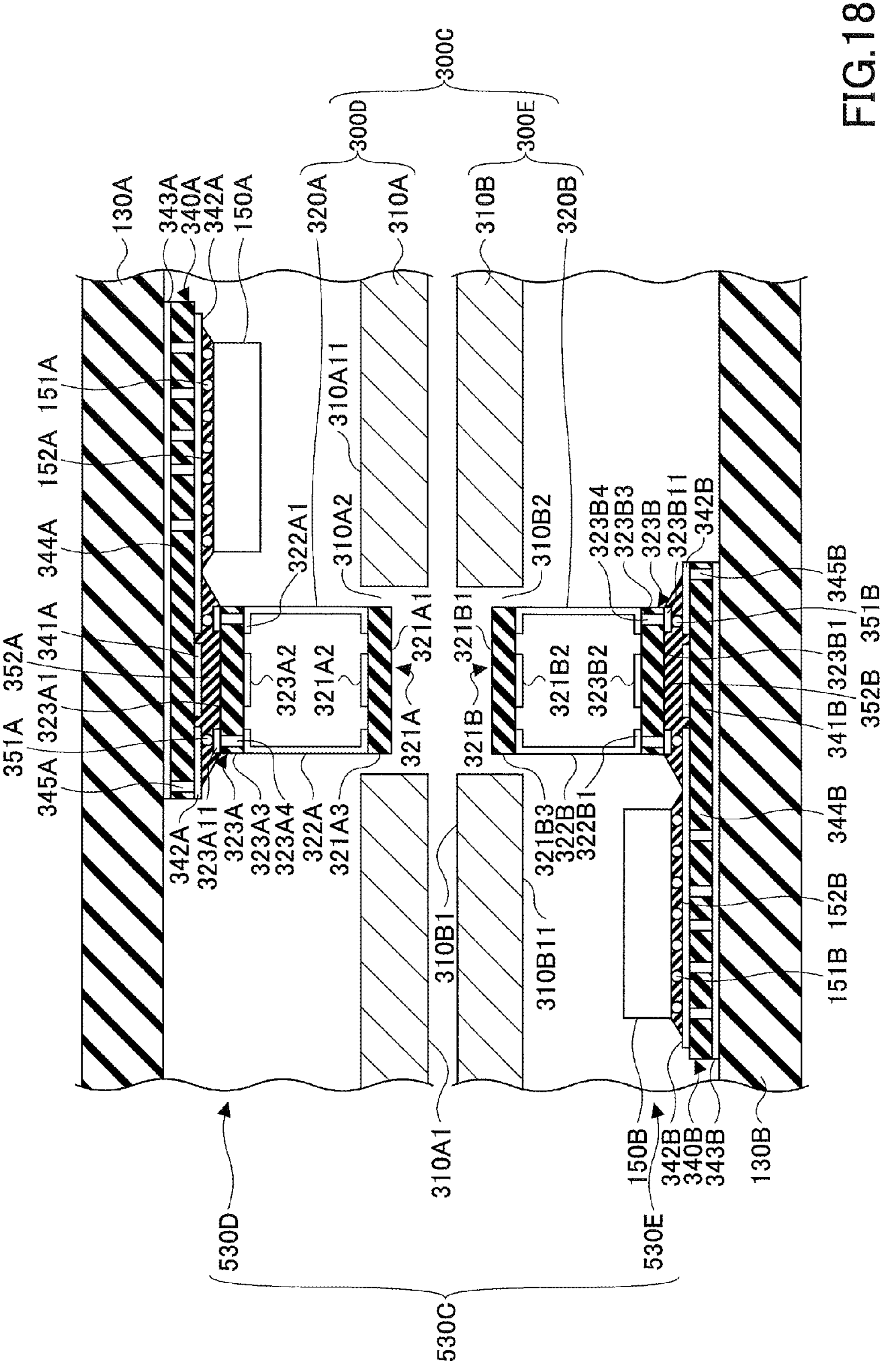
FIG. 18 illustrates a wireless communication device 300C according to a modification example of the third embodiment.

Here, with reference to FIG. 18, a description is given of a wireless communication device 300C according to a modification example of the third embodiment.

FIG. 18 illustrates a wireless communication device 300C according to a modification example of the third embodiment.

The wireless communication device 300C according to a modification example of the third embodiment is constituted by respectively adding a resonance substrate 323A and a resonance substrate 323B to the resonance device 320A and the resonance device 320B of the wireless communication device 200 according to the second embodiment. The wireless communication device 300C includes a wireless communication device 300D and a wireless communication device 300E.

Furthermore, an electronic device 530C according to the modification example of the third embodiment includes an electronic device 530D and an electronic device 530E.

The configurations other than the above are the same as those of the wireless communication device 300 and the electronic device 530 according to the third embodiment, and therefore the same constituent elements are denoted by the same reference numerals, and descriptions thereof are omitted.

The resonance device 320A illustrated in FIG. 18 includes the resonance substrate 321A, the waveguide tube 322A, and the resonance substrate 323A. The resonance device 320A illustrated in FIG. 18 includes the resonance substrate 323A instead of the end part 322A1 of the resonance device 320A illustrated in FIG. 17.

The resonance substrate 323A includes a ground element 323A11, a resonator 323A2, an insulating layer 323A3, and vias 323A4. The resonance substrate 323A is connected to the other end (top end as viewed in FIG. 17) of the waveguide tube 322A.

In the resonance substrate 323A, the ground element 323A11 of a first plane 323A1 is connected to the wiring layer 342A via the solder balls 351A. The solder balls 351A may be metal bumps.

The resonator 323A2 transmits electromagnetic waves between the resonator 323A2 and the resonator 321A2, and transmits electromagnetic waves between the resonator 323A2 and the resonator 341A, via the waveguide tube 322A.

On the insulating layer 323A3, the ground element 323A11 is formed on the first plane 323A1 that is one side (top side as viewed in FIG. 18), and the resonator 323A2 is formed on the other side (bottom side as viewed in FIG. 18). The vias 323A4 are formed in the insulating layer 323A3.

As the vias 323A4 are connected to the solder balls 351A via the ground element 323A11 surrounding the first plane 323A1, the waveguide tube 322A is maintained at ground potential.

Note that detailed configurations of the resonance substrate 323A are described below.

Similarly, the resonance device 320B illustrated in FIG. 18 includes the resonance substrate 321B, the waveguide tube 322B, and the resonance substrate 323B. The resonance device 320B illustrated in FIG. 18 includes the resonance substrate 323B instead of the end part 322B1 of the resonance device 320B illustrated in FIG. 17.

The resonance substrate 323B includes a ground element 323B11, a resonator 323B2, an insulating layer 323B3, and vias 323B4. The resonance substrate 323B is connected to the other end (bottom end as viewed in FIG. 17) of the waveguide tube 322B.

In the resonance substrate 323B, the ground element 323B11 of a first plane 323B1 is connected to the wiring layer 342B via the solder balls 351B.

The resonator 323B2 transmits electromagnetic waves between the resonator 323B2 and the resonator 321B2, and transmits electromagnetic waves between the resonator 323B2 and the resonator 341B, via the waveguide tube 322B.

On the insulating layer 323B3, the ground element 323B11 is formed on the first plane 323B1 that is one side (bottom side as viewed in FIG. 18), and the resonator 323B2 is formed on the other side (top side as viewed in FIG. 18). The vias 323B4 are formed in the insulating layer 323B3.

As the vias 323B4 are connected to the solder balls 351B via the ground element 323B11 surrounding the first plane 323B1, the waveguide tube 322B is maintained at ground potential.

Note that detailed configurations of the resonance substrate 323B are described below.

Next, with reference to FIGS. 19 through 22, a description is given of the resonance device 320A of the wireless communication device 300 according to the third embodiment.

Figure 19:
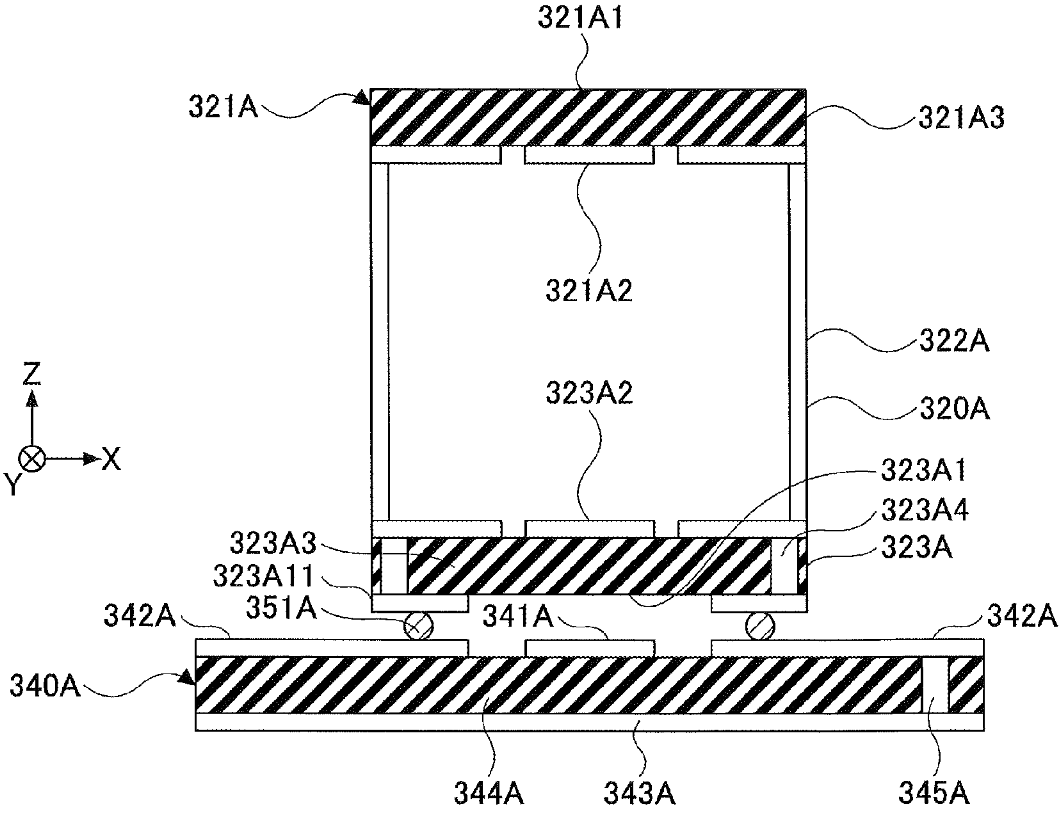
FIG. 19 illustrates a resonance device 320A of the wireless communication device 300 according to the third embodiment.
Figure 20:
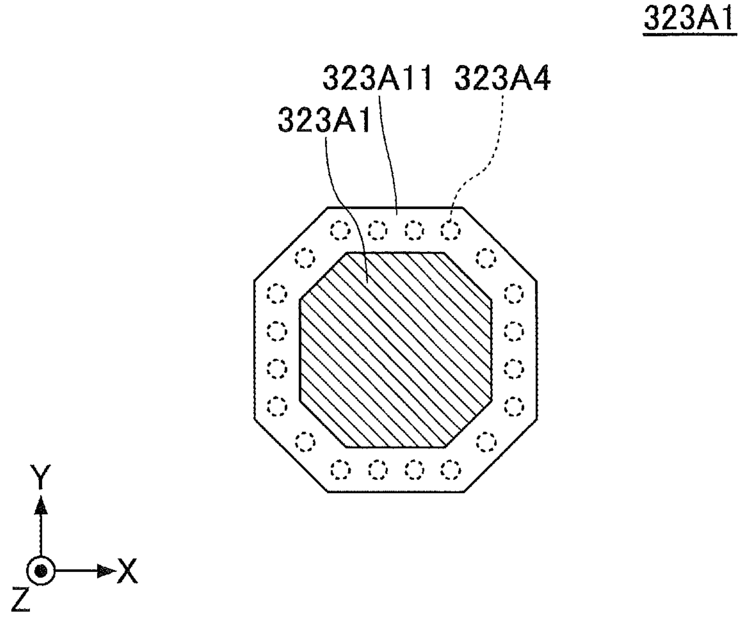
FIG. 20 illustrates a resonance device 320A of the wireless communication device 300 according to the third embodiment.
Figure 21:
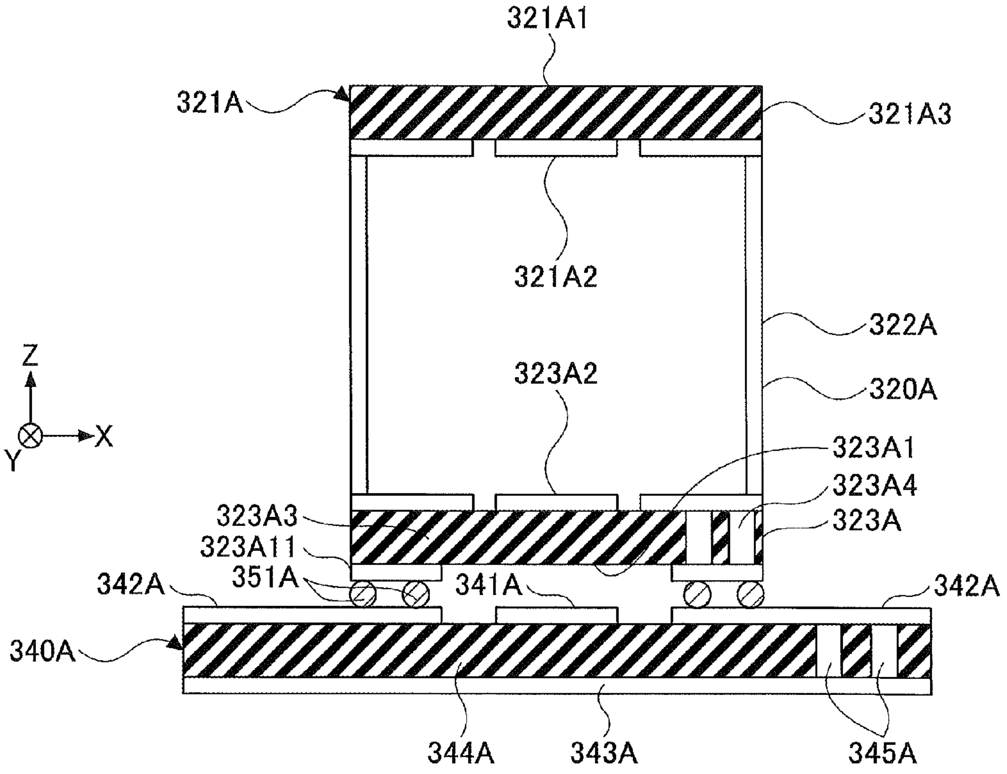
FIG. 21 illustrates a resonance device 320A of the wireless communication device 300 according to the third embodiment.
Figure 22:
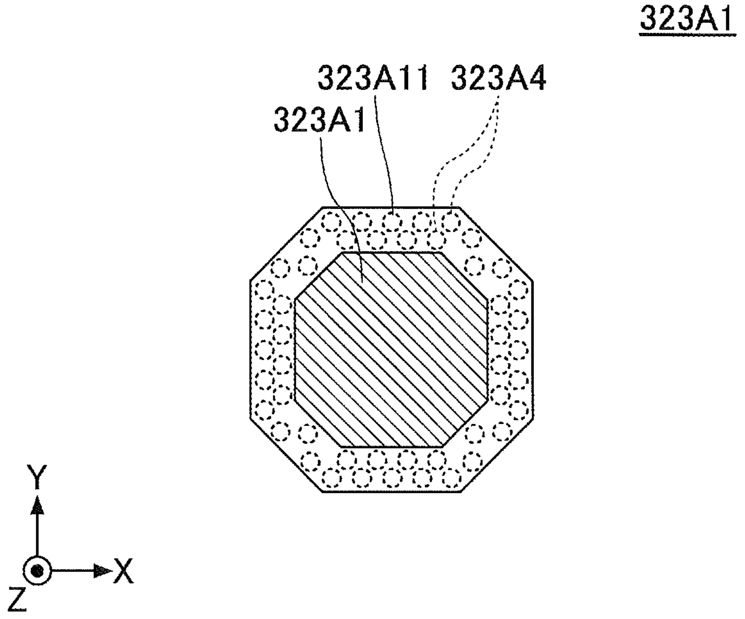
FIG. 22 illustrates a resonance device 320A of the wireless communication device 300 according to the third embodiment.

FIGS. 19 through 22 illustrate the resonance device 320A of the wireless communication device 300 according to the third embodiment. FIGS. 20 and 22 are bottom views and FIGS. 19 and 21 are cross-sectional views. Note that in FIGS. 19 and 21, the resonance device 320A and the substrate 140A are illustrated upside down with respect to those illustrated in FIG. 18. Furthermore, in FIGS. 19 through 22, an XYZ coordinate system is defined, which is an orthogonal coordinate system, as illustrated.

As illustrated in FIG. 19, the resonance device 320A includes the resonance substrate 321A, the waveguide tube 322A, and the resonance substrate 323A. Furthermore, the substrate 340A includes the resonator 341A, the wiring layer 342A, the wiring layer 343A, the insulating layer 344A, and the vias 345A.

The resonance substrate 321A includes the resonator 321A2 and the insulating layer 321A3. For example, the resonator 321A2 may have a configuration of the second plane as illustrated in FIG. 4B. The first plane 321A1 is the front side of the insulating layer 321A3. Furthermore, for example, the resonator 321A2 may have a configuration of the second plane as illustrated in FIG. 4C.

The resonance substrate 323A includes the ground element 323A11, the resonator 323A2, the insulating layer 323A3, and the vias 323A4. For example, the resonator 323A2 may have a configuration of the second plane as illustrated in FIG. 4A or FIG. 4C. The first plane 323A1 is the front side of the insulating layer 323A3.

Furthermore, for example, the first plane 323A1 and the ground element 323A11 may have a configuration as illustrated in FIG. 20. The first plane 323A1 has a center part that is the front side of the insulating layer 323A3, and includes the ground element 323A11 having an octagonal ring shape surrounding the center part.

The ground element 323A11 is connected to the resonator 323A2 via the vias 323A4. There are a plurality of vias 323A4 as illustrated in FIG. 20, and the interval between adjacent vias 323A4 is set to be less than half the wavelength λ in the communication frequency in wireless communication, preferably less than or equal to λ/4.

This is to prevent the electromagnetic waves from leaking outside in the plane direction of the XY plane from the insulating layer 323A3 between the first plane 323A1 and the resonator 323A2.

Furthermore, the wiring layer 342A and the wiring layer 343A of the substrate 340A are connected by the vias 345A, and the wiring layer 342A is maintained at ground potential by being connected to the ground layer of the substrate 130 (see FIG. 18) via the vias 345A and the wiring layer 343A.

Furthermore, as described above, a plurality of solder balls 351A are arranged along the rectangular, ring-shaped cross-section of the waveguide tube 322A in a plan view. The interval between adjacent solder balls 351A is set to be less than half the wavelength λ in the communication frequency of wireless communication, more preferably less than or equal to λ/4. The plurality of arranged solder balls 351A may be a plurality of arranged metal bumps.

This is to prevent the electromagnetic waves from leaking outside form the connection part of the first plane 323A1 and the resonator 341A of the substrate 340A.

Therefore, by forming a plurality of vias 323A4 on the insulating layer 323A3 of the resonance substrate 323A, connecting the ground element 323A11 and the resonator 323A2 by the vias 323A4, and connecting the ground element 323A11 and the resonator 341A by the solder balls 351A, it is possible to connect the resonance device 320A and the transmission path of the substrate 340.

Therefore, as in the resonance device 320A, even in the wireless communication device 300C (see FIG. 18) including the resonance substrate 323A on the side of the substrate 140, it is possible to realize high transmission efficiency, similar to the wireless communication device 300 illustrated in FIG. 17.

Furthermore, as illustrated in FIG. 22, the resonance substrate 323A may include even more vias 323A4, such that two rows of vias 323A4 are arranged on an inner periphery and an outer periphery. Similarly, in the wireless communication device 300C, even more solder balls 351A may be included, such that two rows of solder balls 351A are arranged on an inner periphery and an outer periphery. Furthermore, the substrate 340A of the wireless communication device 300C may include even more vias 345A.

As described above, when even more vias 323A4, solder balls 351A, or vias 345A are provided, it is possible to suppress the electromagnetic waves from leaking from the wireless communication device 300C even more effectively, and high transmission properties are achieved.

The wireless communication device and the electronic device according to the present invention are not limited to the specific embodiments described herein, and variations and modifications may be made without departing from the scope of the present invention.

According to an aspect of the embodiments, a wireless communication device and an electronic device having high transmission efficiency are provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:

a first housing including a first opening part;

a second housing including a second opening part facing the first opening part, the second housing being arranged to face the first housing;

a first resonance device including a first resonator, the first resonance device being arranged inside the first housing such that the first resonator is facing outside from the first opening part; and a second resonance device including a second resonator, the second resonance device being arranged inside the second housing such that the second resonator is facing outside from the second opening part and is facing the first resonator, wherein the first resonance device further includes a first waveguide tube that is connected to the first resonator and that is also connected to a first transmission path arranged inside the first housing, or the second resonance device further includes a second waveguide tube that is connected to the second resonator and that is also connected to a second transmission path arranged inside the second housing, and wherein the first resonance device further includes a third resonator that is connected to an end part of the first waveguide tube on an opposite side with respect to an end part of the first waveguide tube to which the first resonator is connected, and the first waveguide tube is connected to the first transmission path via the third resonator, or the second resonance device further includes a fourth resonator that is connected to an end part of the second waveguide tube on an opposite side with respect to an end part of the second waveguide tube to which the second resonator is connected, and the second waveguide tube is connected to the second transmission path via the fourth resonator.

2. The wireless communication device according to claim 1, wherein the first opening part is formed in a first wall part of the first housing, the first wall part facing the second housing, and the first resonator is fixed in the first wall part in a state where the first resonance device is inserted in the first opening part, or the second opening part is formed in a second wall part of the second housing, the second wall part facing the first housing, and the second resonator is fixed in the second wall part in a state where the second resonance device is inserted in the second opening part.

3. The wireless communication device according to claim 2, wherein the first wall part includes a first recessed part that is recessed inward into the first housing, and the first opening part is formed in the first recessed part, or the second wall part includes a second recessed part that is recessed inward into the second housing, and the second opening part is formed in the second recessed part.

4. The wireless communication device according to claim 2, wherein a radiation plane of the first resonator is positioned outside of the first housing, more than a plane of the first wall part positioned inside the first housing, in the first opening part, or a radiation plane of the second resonator is positioned outside of the second housing, more than a plane of the second wall part positioned inside the second housing, in the second opening part.

5. The wireless communication device according to claim 1, wherein the first resonance device is mounted on a first substrate arranged inside the first housing, such that the first resonator is arranged inside the first housing so as to face outside from the first opening part, or the second resonance device is mounted on a second substrate arranged inside the second housing, such that the second resonator is arranged inside the second housing so as to face outside from the second opening part.

6. The wireless communication device according to claim 5, wherein the first opening part is formed in a first wall part of the first housing, the first wall part facing the second housing, and a radiation plane of the first resonator is positioned outside of the first housing, more than a plane of the first wall part positioned inside the first housing, in the first opening part, or the second opening part is formed in a second wall part of the second housing, the second wall part facing the first housing, and a radiation plane of the second resonator is positioned outside of the second housing, more than a plane of the second wall part positioned inside the second housing, in the second opening part.

7. The wireless communication device according to claim 5, wherein the first resonance device is mounted on the first substrate via solder balls or metal bumps, or the second resonance device is mounted on the second substrate via solder balls or metal bumps.

8. The wireless communication device according to claim 1, further comprising:

a first attenuation unit configured to attenuate electromagnetic waves, the first attenuation unit being arranged around the first resonator in a plan view; and a second attenuation unit configured to attenuate electromagnetic waves, the second attenuation unit being arranged around the second resonator in a plan view.

9. An electronic device comprising:

a first housing including a first opening part;

a second housing including a second opening part facing the first opening part, the second housing being arranged to face the first housing;

a first resonance device including a first resonator, the first resonance device being arranged inside the first housing such that the first resonator is facing outside from the first opening part;

a second resonance device including a second resonator, the second resonance device being arranged inside the second housing such that the second resonator is facing outside from the second opening part and is facing the first resonator;

a first substrate including a first transmission path connected to the first resonance device, the first substrate being arranged inside the first housing;

a second substrate including a second transmission path connected to the second resonance device, the second substrate being arranged inside the second housing;

a first processing unit that is mounted on the first substrate and that is connected to the first transmission path; and a second processing unit that is mounted on the second substrate and that is connected to the second transmission path, wherein the first resonance device further includes a first waveguide tube that is connected to the first resonator and that is also connected to a first transmission path arranged inside the first housing, or the second resonance device further includes a second waveguide tube that is connected to the second resonator and that is also connected to a second transmission path arranged inside the second housing, and wherein the first resonance device further includes a third resonator that is connected to an end part of the first waveguide tube on an opposite side with respect to an end part of the first waveguide tube to which the first resonator is connected, and the first waveguide tube is connected to the first transmission path via the third resonator, or the second resonance device further includes a fourth resonator that is connected to an end part of the second waveguide tube on an opposite side with respect to an end part of the second waveguide tube to which the second resonator is connected, and the second waveguide tube is connected to the second transmission path via the fourth resonator.

* * * * *